United States Patent [19]

Ito et al.

[11] Patent Number: 6,128,571

[45] Date of Patent: *Oct. 3, 2000

[54] VEHICLE NAVIGATION SYSTEM

[75] Inventors: Yasunobu Ito; Mitsuhiro Nimura, both of Okazaki, Japan

[73] Assignee: Aisin AW Co., Ltd., Anjo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/726,858

[22] Filed: Oct. 4, 1996

[30] Foreign Application Priority Data

Oct. 4, 1995 [JP] Japan .................................. 7-258040
Mar. 27, 1996 [JP] Japan .................................. 8-097737

[51] Int. Cl.⁷ .................................................. G06F 165/00
[52] U.S. Cl. ........................ 701/201; 701/209; 701/211; 340/995
[58] Field of Search ..................................... 701/201, 202, 701/204, 208, 209, 211, 295; 340/990, 998, 995

[56] References Cited

U.S. PATENT DOCUMENTS

| | | | |
|---|---|---|---|
| 4,954,959 | 9/1990 | Moroto et al. | 701/211 |
| 4,992,947 | 2/1991 | Nimura et al. | 701/210 |
| 5,442,557 | 8/1995 | Kaneko | 340/990 |
| 5,450,343 | 9/1995 | Yurimoto et al. | 701/208 |
| 5,452,212 | 9/1995 | Yokoyama et al. | 701/201 |
| 5,638,279 | 6/1997 | Kishi et al. | 340/990 |
| 5,784,059 | 7/1998 | Morimoto et al. | 345/353 |
| 5,787,383 | 7/1998 | Moroto et al. | 701/210 |

FOREIGN PATENT DOCUMENTS

| | | |
|---|---|---|
| 0 419248 | 3/1991 | European Pat. Off. . |
| 0 539143 | 4/1993 | European Pat. Off. . |
| 0 638887 | 2/1995 | European Pat. Off. . |
| 61-194473 | 8/1986 | Japan . |
| 61-194475 | 8/1986 | Japan . |

OTHER PUBLICATIONS

Frank, D.L. "Information Systems: An Integral Part of Future Vehicles." Proceedings of the Vehicle Navigation and Information Systems Conference, Toronto, Sep. 11–13, 1989, pp. 85–88.

*Primary Examiner*—Tan Nguyen
*Attorney, Agent, or Firm*—Oliff & Berridge, PLC

[57] ABSTRACT

A navigator apparatus includes a map memory for storage of road map information, and a target data memory storing therein guidance information as to a destination or target object under search. A present position detector is provided for detecting a present position of a mobile vehicle. A route finder responsive to receipt of part of the map information for attempting to find out a route leading to a nearby position of the target from one of a start point of the vehicle and the present position thereof. A target searcher functions to search for a position of the target being presently stored in the target data memory in correspondence with the map information as stored in the map memory. The map information and resultant information as to the target found are both visually indicated on the screen of an associated display device while permitting voice guidance.

20 Claims, 28 Drawing Sheets

FACILITY DATA FILE F16

| | |
|---|---|
| | FACILITY NUMBER |
| 1 | GENRE NUMBER |
| | LONGITUDE COORDINATES |
| | LATITUDE COORDINATES |
| | MARK NUMBER |
| | NAME OR TITLE |
| | ⋮ |
| 2 | GENRE NUMBER |
| | LONGITUDE COORDINATES |
| | LATITUDE COORDINATES |
| | MARK NUMBER |
| | NAME OR TITLE |

FIG. 3

RAM #1  5

| |
|---|
| PRESENT POSITION DATA |
| ABSOLUTE DIRECTION DATA |
| RELATIVE DIRECTION DATA |
| TRAVEL/DISTANCE DATA |
| PRESENT POSITION INFO |
| VICS DATA |
| ATIS DATA |
| REGISTERED TARGET POINT DATA |
| GUIDANCE START POINT DATA |
| FINAL GUIDANCE POINT DATA |
| GUIDANCE ROUTE DATA |
| MODE SET DATA |
| BEEP POINT DATA |
| SEARCH FACILITY NO. |
| FACILITY-TO-TARGET POINT DISTANCE |
| VEHICLE-TO-FACILITY DISTANCE |
| FACILITY-TO-ROUTE DISTANCE |
| RIGHT/LEFT DATA |

FIG. 4

LANDMARK DATA

| LANDMARK NUMBER (M) | OFFSET VALUE | MARK PATTERN NUMBER | FACING ROAD NUMBER | | | |
|---|---|---|---|---|---|---|
| 1 | | | | | | |
| ⋮ | | | | | | |
| M | | | | | | |

FIG. 23d

MARK PATTERN DATA

```
0: ○○ BANK MARK ILLUSTRATION DATA
1: ◇◇ BANK MARK ILLUSTRATION DATA
2: □□ BANK MARK ILLUSTRATION DATA
3: △△ GS MARK ILLUSTRATION DATA
4: ▽▽ GS MARK ILLUSTRATION DATA
```

FIG. 23c

| ROAD NO. | NEXT ROAD NO. WITH SAME START POINT | NEXT ROAD NO. WITH SAME END POINT | START POINT | END POINT | NODE ARRAY POINTER | ROAD LENGTH | LANDMARK NO. |
|---|---|---|---|---|---|---|---|
| ① | ⑪ | ④ | II | I | A000 | 1000 | |
| ② | ③ | ⑫ | I | II | A0A0 | 1000 | |
| ③ | ② | ⑥ | I | IV | A0B3 | 2000 | |
| ④ | ⑤ | ① | IV | I | A0C0 | 2000 | |
| ⑤ | ⑧ | ⑤ | IV | III | A0DE | 1500 | |
| ⑥ | ⑥ | ⑦ | III | IV | A101 | 1500 | |
| ⑦ | ⑫ | ⑩ | V | IV | A201 | 800 | |
| ⑧ | ⑨ | ⑪ | IV | V | A221 | 800 | |
| ⑨ | ④ | ⑨ | IV | VII | A253 | | |
| ⑩ | ⑩ | ③ | VII | IV | A260 | | |
| ⑪ | ① | ⑬ | II | V | A265 | | |
| ⑫ | ⑭ | ② | V | II | A28B | | |
| ⑬ | ⑬ | ⑧ | VI | V | A2A0 | | |
| ⑭ | ⑦ | ⑭ | V | VI | A2B0 | | |

FIG. 24

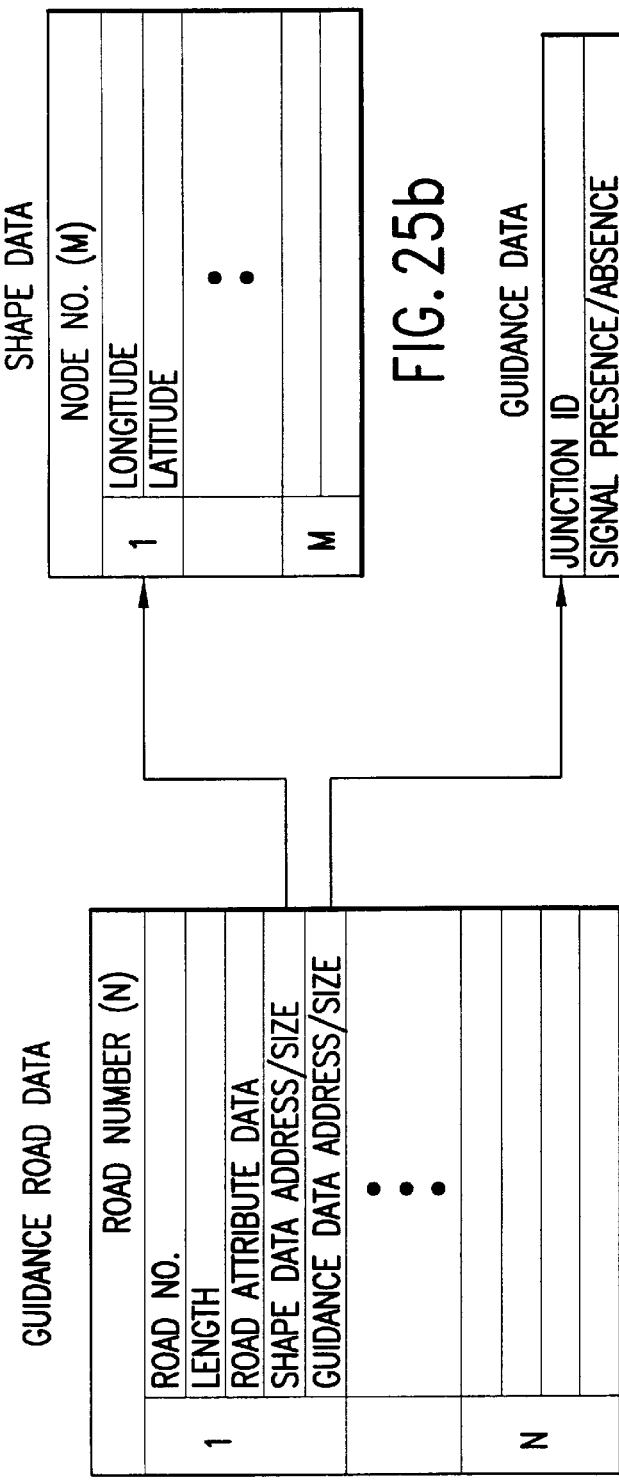
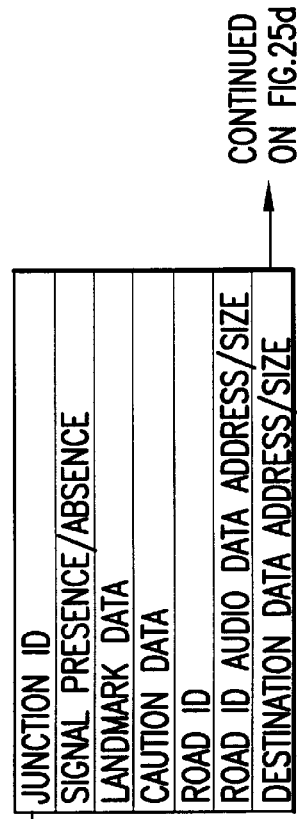
FIG. 25b
FIG. 25C
FIG. 25a

ROAD ATTRIBUTE DATA | PRESENCE/ABSENCE INFO PRESENT

| | | |
|---|---|---|
| ELEVATED TRACK/ SUBWAY DATA | ELEVATED TRACK | |
| | BESIDE ELEVATED | |
| | SUBWAY ROAD | ○ |
| | BESIDE SUBWAY ROAD | |
| LANE NO. | MORE THAN THREE LANES | |
| | TWO LANES | ○ |
| | SINGLE LANE | |
| | NO CENTER LINE | |

FIG. 26a

ROAD ID DATA

| ROAD TYPE | TYPE NO. |
|---|---|

| | | |
|---|---|---|
| HIGHWAY | MAIN | 1 |
| | ACCESS | 2 |
| CITY SPEEDWAY | MAIN | 3 |
| | ACCESS | 4 |
| TOLL ROAD | MAIN | 5 |
| | ACCESS | 6 |
| PUBLIC ROADS { NATIONAL ROAD | | 7 |
| PREFECTURAL ROAD | | 8 |
| OTHERS | | 9 |

FIG. 26b

CAUTION DATA

| | |
|---|---|
| RAILROAD CROSSING | ○ |
| TUNNEL ENTRANCE | |
| TUNNEL EXIT | |
| WIDTH DECREASE POINT | |
| NONE | |

FIG. 26c

GUIDANCE DATA

| | |
|---|---|
| FROM RIGHT | |
| FROM LEFT | |
| FROM CENTER | ○ |
| NONE | |

FIG. 26d

VEHICLE NAVIGATION SYSTEM

BACKGROUND OF THE INVENTION

1. Field of the Invention

The invention relates generally to navigation systems for directing the movement of an object so that it will reach its intended destination, and more particularly to vehicle navigation systems searching for a movement path or guidance route of a ground mobile object based on map information to provide mobile-object operators with information concerning the route. The invention also relates to a vehicle navigation apparatus as enhanced with on-map searching of a surface target object and indication of the information thereof.

2. Description of the Related Art

As one navigation system, a vehicle navigation apparatus is described for example in Published Unexamined Japanese Patent Application (PUJPA) No. 61-194473. This vehicle navigation apparatus comes with a display device for visually indicating any part of a road map as desired by a user. The map displays on the screen the presentation of several conditions required to search for an intended facility that is presently set as a destination or target point at which the vehicle aims. Hierarchical selection of several steps of conditions may allow the user to finally identify the facility the user wants to reach.

The location of such identified facility is then displayed by use of an identification mark on the map display screen. In addition, one recommendable movement path or route from a present position is searched for by the navigation apparatus based on the map information to be displayed simultaneously. Note here that while the mobile object, here vehicle, is travelling along the path of such recommended guidance route, necessary surface environmental information may be given to the user by means of audible presentation schemes such as guidance voices.

With the navigation apparatus, it may happen that the user changes his or her mind on the movement route or at a nearby point of the vehicle's present position and would prefer to visit a facility other than the target place determined earlier, for example, a place to eat or to refuel. In the case where the user wants to stop at a facility excluding the target place, it is required that such temporal "stop-at" place be again designated through iterative search operations based on the map information. The search operations may be similar to those in the initial entry of target place under substantially the same search conditions, which may include designation genre or category.

The genre being designated may involve, for example, a gas station or restaurant. Since the objective to stop at such facility is clear, selection is limited in order to extract only those facilities which meet the objective. One example is that the objective of stopping at such place is to refuel the vehicle. If this is the case, genre designation is made to search for gas stations only. In this way, once the genre is designated, a plurality of facilities belonging to such genre will be found and extracted.

In the prior art navigation apparatus the linear distance toward each facility extracted is visually indicated on the display screen. Note, however, that any relative positional relation of the user's vehicle and the facility remains indeterminate before an image of the exact "stop-at" facility is displayed on the map display screen. More particularly, the related art fails on some occasions to specifically indicate the geographic position with relation to a recommended movement route. This makes it difficult for the user to promptly figure out which one of the presently displayed facilities perfectly matches his or her desires.

With respect to a second embodiment of the invention, various types of vehicle navigation systems are presently available which provide route guidance to assist a vehicle to arrive at a user's desired target place by searching for an optimum route thereto. When the user inputs a target place, the system searches for an optimal route to the target place from a present position of the vehicle as detected using GPS or gyro, and indicates on a display on or near the dashboard of the vehicle a map image including the optimal route and a mark indicative of the vehicle's present position. When the user begins driving the vehicle along the optimal route displayed, the system continues providing route guidance to the target place by informing the user of appropriate instructions as to which course should be chosen next at a position whereat the system determines that further guidance is needed. For example, while the vehicle comes closer, by a certain distance, to a road junction or intersection whereat the vehicle should turn to the right or the left, the system attempts to display an enlarged diagram of such intersection while informing the user of a recommended running direction by use of audible or visual indication schemes to thereby provide a proper guidance route leading to the target place. The system allows, during display of such enlarged intersection diagram, the user to check the running direction at the intersection by visually indicating the position of a "landmark" near the intersection with a mark on the map image as presently displayed. The landmark may be, for example, a mark or symbol of a bank, a convenience store, which facilitates the user to quickly assure that the user is at the intersection in question. In this respect, the map being displayed during the route guidance, based on a course searched by the system, is designed to provide a minimized amount of information to retain quality visibility while the user is driving the vehicle.

However, on the user's side, more information as to the environment near the vehicle's present position is increasingly demanded. There exists a tradeoff: increasing such additive information to be displayed on the map image may reduce the visibility as a whole. For example, the user may want to get information as to some eating houses or restaurants near the vehicle's present position. Alternatively, the user may want to know where the nearest facility of interest, such as a gas station is located. On such occasions, simply displaying all the information as required makes the map difficult to be observed.

One navigation system avoiding the problem is disclosed in PUJPA No. 61-194475, wherein a pattern display scheme is employed allowing the kind of related facilities displayable on a road map to be visually indicated using a pattern image at a predefined position on the screen of an associated display device. This may enable the user to display a pattern image of related facilities at certain positions on the map being displayed on the display device.

A significant disadvantage of the prior known system is that all the information is increased in amount causing necessary data storage devices to be complicated in structure and in architecture. More specifically, in cases where the system is arranged to separately store the guidance information data of landmarks, and the information data used to search for the user's desired facility around the vehicle's present position, for use in checking for the vehicle's running direction in the enlarged intersection diagram, the resulting amount of information to be stored increases resulting in more complexity as a whole. In some cases, it may be required that the search information data and guidance display data be redundantly stored which further increases complexity in the system arrangement. In particular, this will become more serious when the system is designed for information-rich midtown areas which come with an increased amount of data to be stored resulting in an increase in storage capacity of the system per se. This necessitates installation of extra add-in memory devices thus increasing the manufacturing cost of the system as a whole.

SUMMARY OF THE INVENTION

It is therefore an object of the invention to provide an improved navigation apparatus capable of avoiding the problems encountered with the related art.

To achieve the foregoing object, the invention provides a navigation apparatus including a map information storage device for storing therein map information, a target data storage device for storing guidance information as to a target object under request, a present position detector device for detecting a present position of a mobile vehicle, a route finder device responsive to receipt of part of the map information as stored in the map information storage device for attempting to find out a path or route leading to a nearby target position from one of a start point of the vehicle and a present position thereof, a target search device for searching for a target position being presently stored in the target data storage device in a one-to-one correspondence manner with the map information as stored in the map information storage device, and an output device for providing the map information and information on the target as found by the target search device.

In accordance with another aspect of the invention, there is provided a navigation apparatus including a map information memory for storing therein map information, a present position detector for detecting a present position of a vehicle, a route finder for attempting to search, based on the map information stored in the map information memory, for a route leading to a nearby target position from one of a position near a present position detected by the present position detector and a position near a start point of the vehicle, a target input device for allowing entry of a desired target object, a target search device for searching for an input target through the target input device from the map information as stored in the map information memory, a schematic diagram preparation device responsive to a route searched by the route finder and a target searched by the target search device for producing a schematic diagram indicative of a positional correlation of the route and the target, and an output device for generating and issuing the schematic diagram provided by the schematic diagram preparation device.

In accordance with a further aspect of the invention, a navigation apparatus includes a map information memory for storage of map information, a route finder responsive to receipt of the map information stored in the map information memory for searching for a route leading to a target point from one of a start point of a vehicle and a nearby point of the present position of the vehicle, a target searcher for searching for a position of the target in correspondence with the map information stored in the map information memory, a target identifier for determining on which side of a route being searched by the route finder a target exists while this target is presently searched by the target searcher, and an output device for providing "which-side" information relating to a resultant side on which the target exists with respect to the route as identified by the target identifier.

With respect to the second embodiment of the invention, it is an object of the invention to provide a navigator apparatus capable of searching for nearby facilities around a present position of a vehicle while eliminating any increase in required data capacity yet enhancing visibility by use of information of landmarks as used for guidance display.

To attain the foregoing object, the second embodiment is specifically arranged as follows:

(1) In a navigator providing route guidance with movement of the vehicle, the nearest or nearby facility is searched and guided without having to increase the data capacity of associated storage devices.

(2) In a vehicle navigator, comprising an information storage device for storing therein map information for use in drawing map information, a present position detector for detecting a present position, an input device for allowing entry of search conditions, a searcher for accessing the information storage device to search for one or several facilities near the present position based on the conditions as input by the input device, a display device for displaying a search result obtained from the searcher, and a selector for selecting at least one facility from among those being displayed on the display device, the improvement wherein the map information stored in the information storage device may include landmark information as to facilities, wherein the searcher conducts a search based on the landmark information, and wherein the display device visually indicates the map information with a certain facility selected by the selector as a center.

These and other objects, features and advantages of the invention will be apparent from the following more particular description of preferred embodiments of the invention, as illustrated in the accompanying drawings.

BRIEF DESCRIPTION OF THE DRAWINGS

The preferred embodiments of this invention will be described in detail, with reference to the following figures, wherein:

FIG. 3 is a diagram showing the content of a facility data file F16.

FIG. 4 is a diagram showing data stored in a RAM 5.

FIGS. 23a–d are diagrammatic representations for explanation of a road junction or intersection as processed by the navigation apparatus.

FIG. 24 is a table showing the road network and route search data of the navigation apparatus.

FIGS. 25a–e and 26a–d are illustrations showing, in configuration, several road data items of the navigation apparatus.

DETAILED DESCRIPTION OF THE INVENTION

1. Overview of Embodiments

One preferred embodiment of the present invention as will be described below is a navigation apparatus which features some functions that follow: searching for a target object as externally input thereto from map information (see a step SC6 shown in FIG. 11), selectively extracting, based on the map information concerning the resulting searched target object, one or more target objects being located along a searched route leading to a nearby position of the target from either the vehicle's start point or a present position thereof (see step SD2 of FIG. 12), and generating and issuing information as to a resultant target object being selectively extracted.

It should be noted that an embodiment described later is also a navigation apparatus which features several functions as follows: searching based on the map information for an appropriate or best-suited guidance route leading to a nearby position of a target point from either the vehicle's start point or its present position (see step SA4 in FIG. 9), searching for an externally input target object from the map information (at step SC6 of FIG. 11), selectively extracting, based on the map information as to the resulting searched target object, one or more target objects located along the searched route (see step SD2 of FIG. 12), and outputting information on selectively extracted target object(s) (see steps SE4, SE11 of FIG. 14 and step SF1 in FIG. 15, also relating to a speaker 13).

Figure 14:
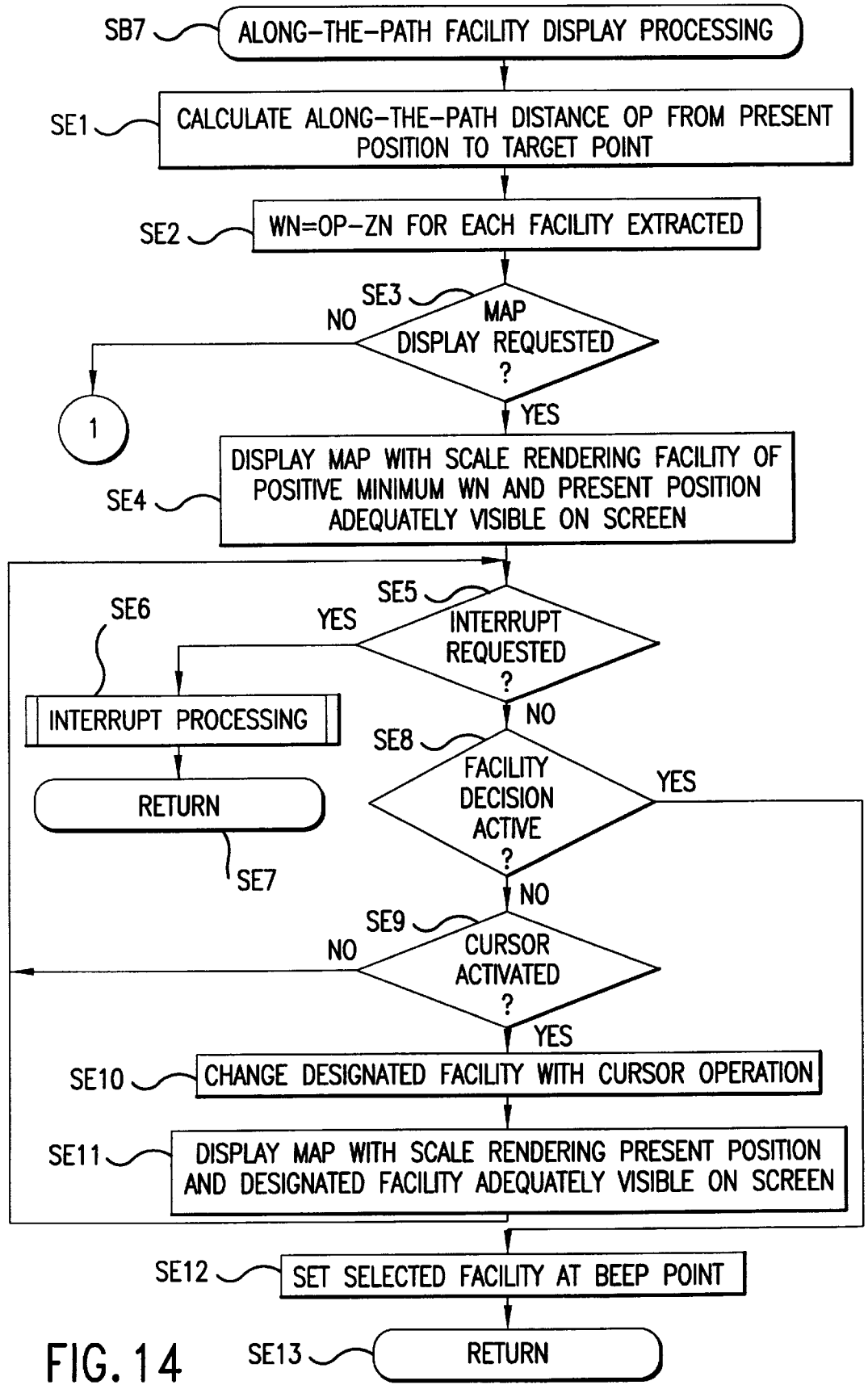
FIGS. 14 and 15 are each a flow diagram of a routine of indication of a certain "along-the-path" facility located along the guidance route.
Figure 15:
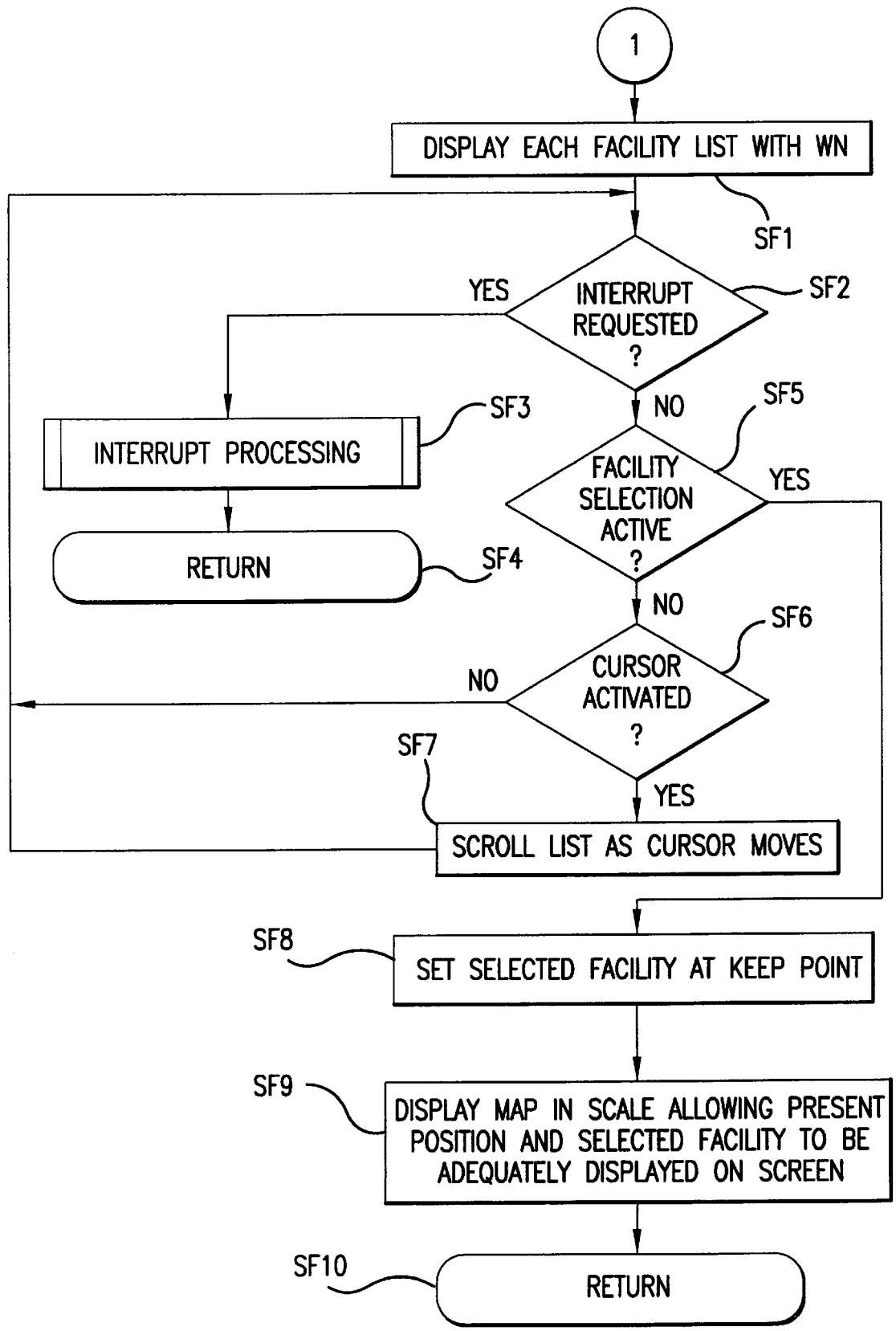

It should be also noted that the navigation apparatus embodying the invention: searches based on the map information for a route leading to a nearby position of a target point from either the vehicle's start point or a present position thereof (see step SA4 in FIG. 9), searches based on the map information and the resulting searched route for an externally input target object (step SC6 in FIG. 11 and step SD2 of FIG. 12), and provides information as to this searched target object (steps SE4, SE11 of FIG. 14 and step SF1 of FIG. 15, also concerning speaker 13).

It should be further noted that the navigation apparatus embodying the invention includes a map information storage device (corresponding to an optical recording medium or a magnetic recording medium such as a floppy diskette drive module as arranged in a data storage section 37) for prestoring therein map information, a present position detector that detects a present position of a mobile vehicle (step SA2 of FIG. 9), a route finder that searches, based on the map information as stored in the map information storage device, for a route toward a target point from either the vehicle's present position as detected by the present position detector or the vehicle's start point (the route search processing shown at step SA4 of FIG. 8), a target input device that allows entry of any desired target object (steps SC1 to SC3 in FIG. 11), a target searcher that searches for the target object as inputted by the target input device from the map information stored in the map information storage device (step SC6 of FIG. 11 and step SD2 of FIG. 12), a distance calculator for calculating or computing a distance between the target searched by the target searcher and the present position as detected by the present position detector (step SD2 of FIG. 12), a schematic diagram drafter for preparing (based on the present position detected by the present position detector, position data of the target object detected by the target searcher and the distance as calculated by the distance calculator) a schematic diagram that indicates the positional correlation of the present position and the target object (step SF1 in FIG. 15), and an output device (corresponding to a display 33 or speaker 13) for generating and issuing the resulting schematic diagram as provided by the schematic diagram drafter.

It should be further noted that the navigation apparatus embodying the invention may alternatively include a map information storage device (corresponding to an optical recording medium or a magnetic recording medium such as a floppy diskette drive module as arranged in data storage section 37) for prestoring therein map information, a route finder for searching, based on the map information as stored in the map information storage device, a route toward a nearby position of a target point from either the vehicle's present position or the vehicle's start point (see step SA4 of FIG. 9), a target input device for allowing entry of any desired target object (steps SC1 to SC3 in FIG. 11), a target searcher for searching for the target object as inputted by the target input device from the map information stored in the map information storage device (step SC6 of FIG. 11), a target selector for selecting from among target objects searched by the target searcher any target object(s) being located within a predefined range from the route searched by the route finder (step SD2 of FIG. 12), a distance calculator for calculating a distance between the target object selected by the target selector and a present position of the vehicle (step SD2 of FIG. 12), a schematic diagram drafter for preparing (based on the route searched for by the route finder, position data of the target object detected by the target searcher, and the distance as calculated by the distance calculator) a schematic diagram that diagrammatically represents the positional correlation of the searched route and the target object (step SF1 in FIG. 15), and an output device (corresponding to display 33 or speaker 13) for generating and issuing the resultant schematic diagram as provided by the schematic diagram drafter.

It should be further noted that the navigation apparatus embodying the invention may alternatively be constituted from a map information storage device (corresponding to an optical recording medium or a magnetic recording medium such as a floppy diskette drive module as arranged in data storage section 37) for prestoring therein map information, a route finder that searches, based on the map information as stored in the map information storage device, for a route toward a nearby position of a target point from a nearby position of either the vehicle's present position or the vehicle's start point (see step SA4 of FIG. 9), a target searcher for searching for the position of a target object (stop-at facility) in correspondence with the map information as stored in the map information storage device (a random access memory or RAM 5, and step SC4 in FIG. 11), a target identifier for determining whether the target object being stored in the target searcher is present within a predetermined range of the route as searched by the route finder (step SD2 of FIG. 12), and an output device (corresponding to a display 33 or speaker 13) for generating and issuing resultant information as to the target as identified by the target identifier (steps SE4, SE11 in FIG. 14 and step SF1 of FIG. 15, also pertinent to speaker 13).

Figure 12:
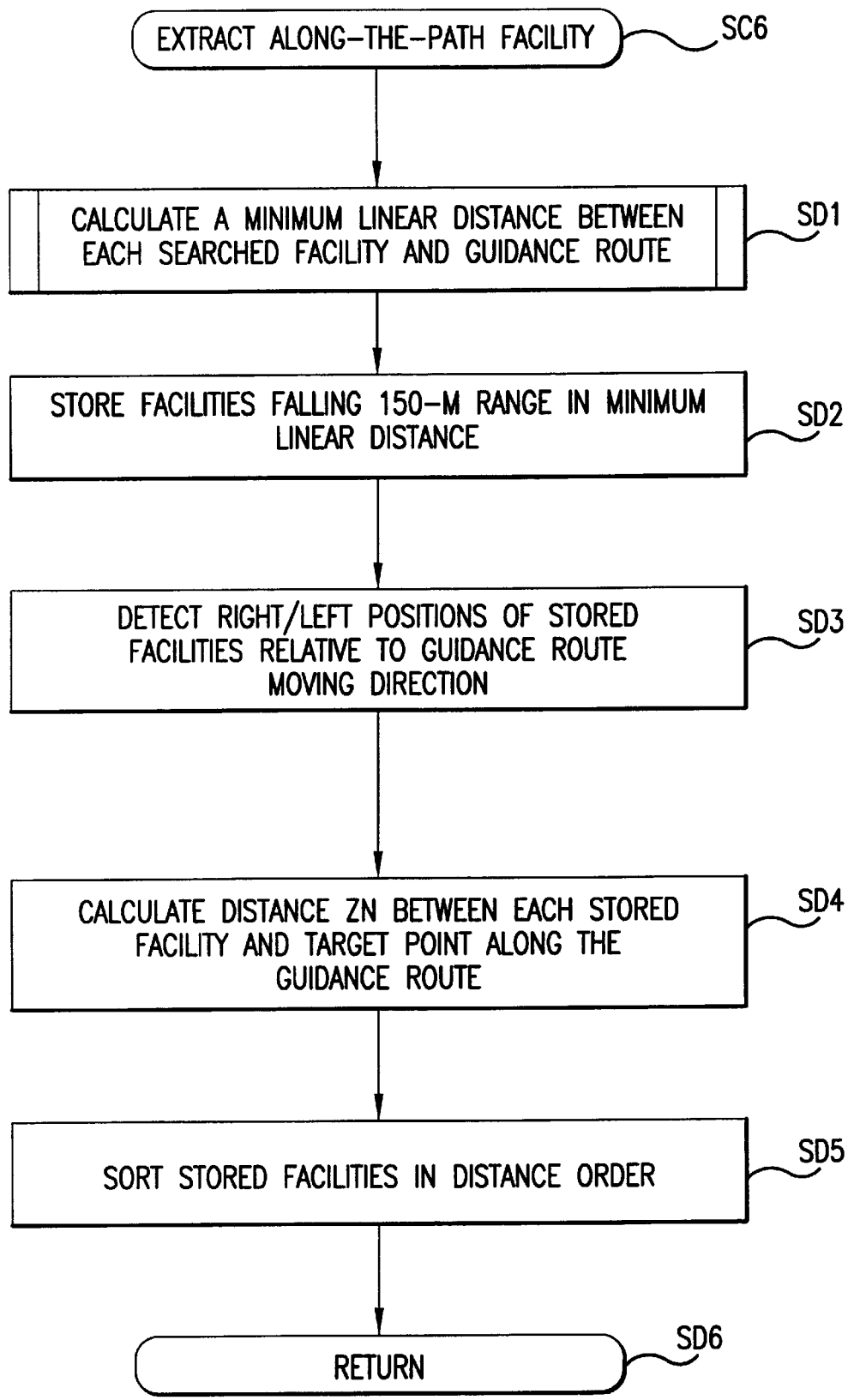
FIG. 12 is a flow diagram of a routine of extraction of a certain facility located along the route.

One feature of the navigation apparatus is that the target along a path or route searched involves one falling within a predefined range from the route along which the vehicle has already traveled, and in that the schematic diagram drafter or the target identifier also processes the target within the predefined range for either preparation of a corresponding schematic diagram or identification thereof (step SD2 of FIG. 12 and step SE2 of FIG. 14).

Another feature of the navigation apparatus is that it further includes a selective target extractor for selectively extracting a specific target from those stored in the target searcher (including extracting conditions regarding environment of roads neighboring a target object), thereby allowing selective extraction and identification of the target to be attained by determining whether the target as selectively extracted is within the predefined range from the searched route.

Still another feature of the navigation apparatus is that the selective target extractor attempts to selectively extract the specific target based on the type (or kind), identification, classification, field, objective, use, business content, and/or geographic relationship between the target and a present position (including the distance between the target and present position, and the direction of the target).

Yet another feature of the navigation apparatus is that it calculates a distance from a present position to the target as identified by the target identifier (step SE2 of FIG. 14), and visually or audibly indicates a resultant calculated distance up to the target (using display 33 or speaker 13).

It should be further noted that the navigation apparatus embodying the invention may be comprised of a map information storage device (data storage section 37) for storing therein map information, a route finder responsive to receipt of the map information stored in the map information storage device for searching for a route leading to a target point from a position of either the start point of a vehicle or a vehicle's present position (route search processing at step SA4 in FIG. 9), a target searcher (first RAM 5, step SC4 of FIG. 11) for searching for the position of the target (geographic coordinates of each "stop-at" facility) in correspondence with the map information stored in the map information storage device, a target identifier for determining on which side of a route a target being presently searched by the target searcher exists (step SD3 in FIG. 12), and an output device (display 33 or speaker 13) for providing information as to the side of the route on which the target exists.

It should be further noted that the navigation apparatus may come with a map information storage device (corresponding to an optical recording medium or a magnetic recording medium such as a floppy diskette drive module as arranged in data storage section 37) for prestoring therein map information, a target searcher that searches for the position of a target object (stop-at facility) in correspondence with the map information (geographic coordinates of each stop-at facility) stored in the map information storage device (RAM 5 and step SC4 of FIG. 11), a point setter for setting a certain point(s) acting as a reference (points X0, Y0 in FIG. 7), a direction setter for setting a certain direction (vector a of FIG. 7) as a reference from the certain point as set by the point setter, an orthogonal direction setter for setting an orthogonal direction (vector c of FIG. 7) with respect to the direction as set by the direction setter, an inner-product product calculator for calculating or computing a vector inner product ($|b|\times|c|\times\cos\theta$) of the orthogonal direction set by the orthogonal direction setter and the direction from the reference point set by the point setter toward the target object, a target identifier for determining based on the calculation result of the calculator which side of the reference direction the target object is present (step SD13 of FIG. 12 determines which polarity the inner product has, i.e., positive or negative), and an output device (display 33 or speaker 13) for generating and issuing the direction of target object as determined by the target identifier.

It should be yet further noted that the navigation apparatus embodying the invention may include a map information storage device (corresponding to an optical recording medium or a magnetic recording medium such as a floppy diskette drive module as arranged in data storage section 37) for prestoring therein map information, a route finder responsive to receipt of the map information stored in the map information storage device for searching for a route leading to a target point from either the start point of a vehicle or its present position (route search processing at step SA4 in FIG. 9), a target searcher for storing therein the position of a target object (stop-at facility) in correspondence with the map information (geographic coordinates of each stop-at facility) stored in the map information storage device (RAM 5 and step SC4 of FIG. 11), a distance calculator for calculating a distance from the route searched by the route finder toward the target object as stored in the target searcher (step SD2 of FIG. 12), and an output device (display 33 or speaker 13) for generating and issuing the distance between the route and target object as calculated by the distance calculator.

2. Overall Circuitry

Figure 1:
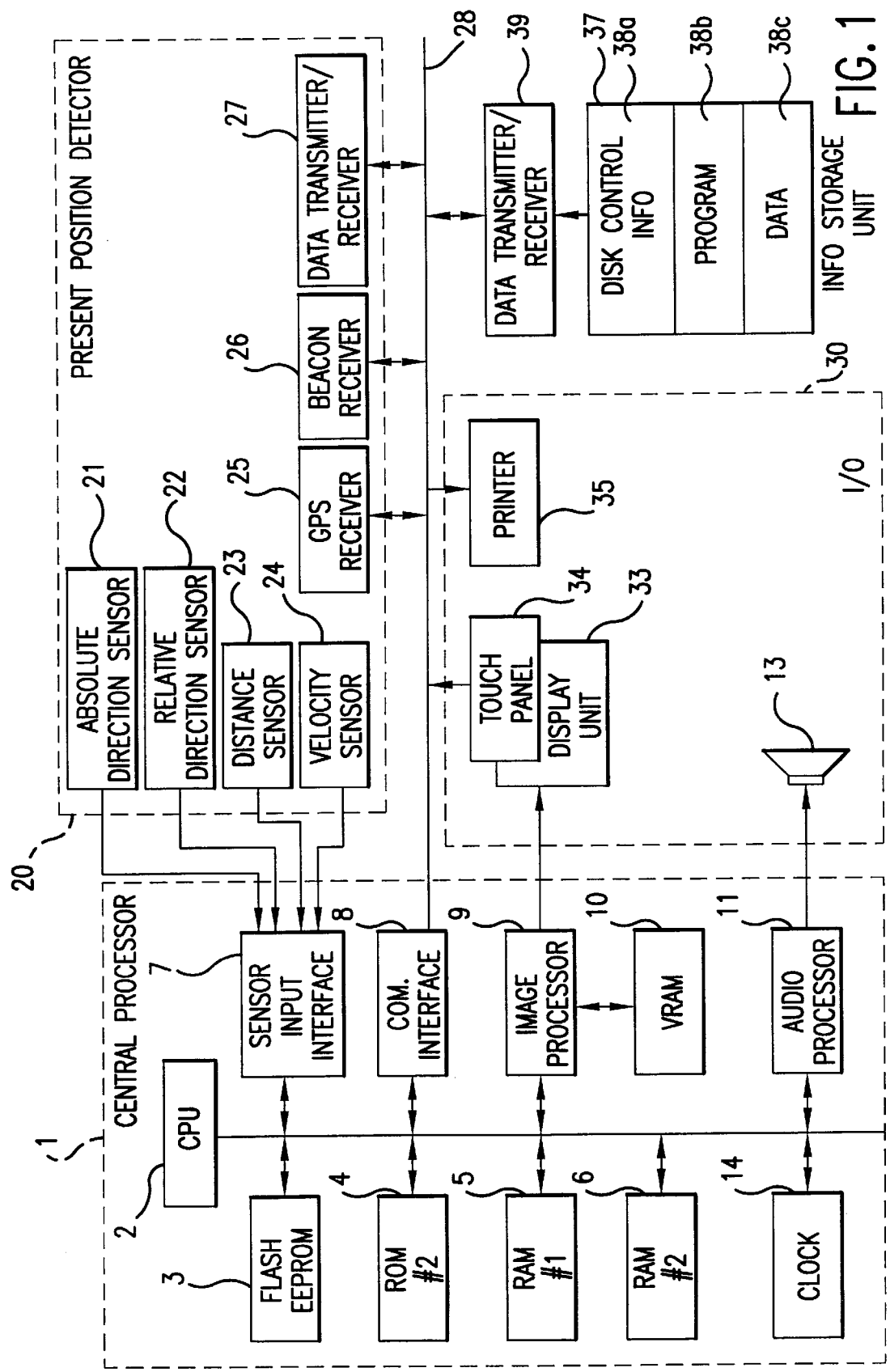
FIG. 1 is a block diagram showing an overall configuration of a navigation apparatus in accordance with one preferred embodiment of the present invention.

FIG. 1 shows the overall configuration of a navigator apparatus embodying the invention. A central processor 1 is provided as a main controller that controls the entire operations of the navigation apparatus. This controller 1 is constituted from a central processing unit (CPU) 2, a nonvolatile semiconductor memory 3 which may be an electrically erasable programmable read only memory (EEPROM) such as "flash" EEPROM, a ROM (ROM #2) 4, a first random access memory (RAM #1) 5, a second random access memory (RAM #2) 6, a sensor data input interface 7, a communication interface 8, an image processor 9, an image memory 10 such as a video RAM (VRAM), an audio processor 11, and a clock 14. All of the components 2–14 are operatively connected together via a CPU local bus 15 allowing several kinds of data or information to be transferred and received under the control of CPU 2.

The flash EEPROM 3 receives a program module 38b prestored in a data storage unit 37. The program module 38b contains those programs with which CPU 2 executes several kinds of tasks in accordance with particular ones of predefined control procedures, for example, display control of information and voice guidance control, as will be presented later.

The information stored in the flash EEPROM 3 may also involve different kinds of parameters for use in navigation control operations. ROM 4 stores therein both graphic display pattern data and several kinds of general-purpose data. The term "display graphic pattern" is intended to mean any data required for accomplishment of route guidance to be visually indicated on the screen of a display unit 33. The "general-purpose data" refers to data used during navigation, for example, voice wave data which may be playback information of electronically synthesized or prerecorded human guidance voices.

The first RAM 5 acts to temporarily store therein: (i) externally supplied input data, (ii) several kinds of parameters, (iii) arithmetic results, and (iv) navigation program modules. The clock 14 generally consists of a counter, a RAM or an EEPROM for battery backup, and serves to generate and issue time information at its output.

The sensor input interface 7 includes an analog-to-digital (A/D) converter circuit, a buffer circuit, or the like. Interface 7 is electrically connected to a respective one of several sensors as provided in a present position detector device 20, and operates to receive sensor data as transmitted from the present position detector device in an analog or digital signal format. The sensors of the present position detector 20 are: (i) an absolute direction sensor 21, (ii) a relative direction sensor 22, (iii) a distance sensor 23, and (iv) a vehicle velocity sensor 24.

The absolute direction sensor 21 may be a geomagnetism sensor that detects the Earth's magnetism to generate at its output a corresponding detection data indicative of the North and South directions defining the absolute direction. Relative direction sensor 22 may be a steering angle sensor, which cooperates with a presently available optical gyroscope (including an optical gyro and a piezoelectric vibration gyro) to detect the actual steering angles of the wheels of an automobile associated therewith. Sensor 22 functions to generate and issue at its output the detected relative angle in the vehicle's travel direction with respect to the absolute direction as detected by absolute direction sensor 21.

The distance sensor 23 may consist of a counter operatively associated with a known odometer of the vehicle. Sensor 23 operates to output certain data representative of the vehicle's measured travel distance. The velocity sensor 24 typically consists of a counter as connected to a known speedometer. Sensor 24 outputs data proportional in value to the running speed of the vehicle.

The communication interface 8 of controller 1 is also connected to an input/output (I/O) data bus 28, which in turn is operatively coupled to a global positioning system (GPS) receiver device 25, a beacon receiver device 26 and data transmitter/receiver device 27 in the present position detector 20. Further connected to I/O data bus 28 are: (i) I/O device 30 including an electronic "touch" panel 34 with a transparent pad sheet and a printer unit 35, and (ii) a data transmitter/receiver device 39 which is in turn connected to an information storage unit 37. Communication interface 8 thus arranged above may enable several kinds of data to be transmitted between respective associated devices and CPU local bus 15.

GPS receiver 25 receives signals (microwaves as transmitted from a plurality of GPS satellites each in an orbit around the Earth) for detection of geographic position determination data including latitude and longitude position data of the vehicle.

Likewise, the beacon receiver 26 receives beacon waves as transmitted from the vehicle information and communication system (VICS), and provides I/O data bus 28 with either certain nearby road traffic information or the GPS's correction data. The data transmission/reception (TX/RX) device 27 transmits and receives any required information, including voice communication signals from handheld cellular phones or frequency-modulation (FM) multiplexed signals. Simultaneously, the TX/RX device 27 allows the present position information or the information as to road transportation conditions in the surrounding or "nearby" area around the vehicle's present position to be transmitted to and received from the existing two-way present position information providing system or advanced traffic information service (ATIS) from the public telecommunication networks. Such information may be used as either vehicle's present position detection information or as auxiliary information therefor. Note here that beacon receiver 26 and data TX/RX 27 may be omitted if needed.

The I/O device 30 includes a speaker unit 13 in addition to display unit 33, touch panel 34 and printer 35. Display unit 33 functions to display necessary guidance information for the user (e.g., a driver of the vehicle) during navigation operations. Touch panel 34 is part of the display screen of display unit 33 in such a manner that a plurality of rows and columns of "touch" switches are organized into a plan or two-dimensional matrix form. The touch switches may be contact switches using, for example, transparent electrodes or piezoelectric switches. Using touch panel 34 allows selective entry of necessary information, for example, target point settings, such as the vehicle's departure or start point, driver's preferred destination or target point, pass-through or transit points in a route leading to the target, and other information.

The printer 35 operates to provide hard-copies of several kinds of information, including, for example, a map picture or a facility guide. The speaker 13 may provide the driver with respective audible guidance information as preferred. Printer 35 is omittable.

The display unit 33 may be structured from any one of presently available image displayable devices, for instance, such as a cathode-ray tube (CRT), liquid crystal display (LCD) panel, or plasma display (PD) panel. An LCD may be preferable in this case due to several advantages: less power consumption, relatively high visibility, and light weight. The display unit 33 is operatively associated with the image processor 9, which in turn is connected to VRAM 10 that may be a dynamic random access memory (DRAM) or dual-port DRAM. Image processor 9 provides controls over writing or programming of image or video data into VRAM 10. Processor 9 also acts to control display operations of any readout video signals as read out of VRAM 10 on the display unit 33.

The image processor 9 is responsive to illustration draft command signals as fed from CPU 2, for converting map information and character data into corresponding image data for display and programming into VRAM 10. At this time, additive peripheral images for display on display unit 33 are also prepared and programmed in VRAM 10 simultaneously.

The speaker 13 is connected to audio processor 11, which is in turn coupled via the CPU local bus 15 to CPU 2 and ROM #2 4. Audio-wave data for guidance voice generation as read from ROM 4 are input to audio processor 11. Such audio-wave data are converted by processor 11 into corresponding analog audio signals, which will be reproduced at speaker 13. Note that audio processor 11 and image processor 9 may be general-purpose digital signal processors (DSPs).

The information storage unit 37 may be structured from not only an optical memory such as a compact disc read-only memory (CD-ROM) but also any one of other types of devices, for example, an integrated circuit (IC) memory, a semiconductor memory such as an IC card, a magneto-optical disk drive module, or a magnetic recording device such as a fixed disk or "hard disk" drive unit. Where the recording media or device in information storage unit 37 is changed, data TX/RX device 39 is also modified to have an appropriate data pickup tool adaptable for the device used. For instance, when the storage device is a hard-disk drive, data TX/RX 39 comes with a read/write device for allowing magnetic signals to be read from or written onto an associative magnetic disk(s), which may be a core head.

The information storage unit 37 has a data storage space, which is subdivided into plural portions. For example, three blocks 38a, 38b, 38c are shown in the illustrative embodiment. The block 38c is for storage of essential data as required to execute navigation operations. This data may include, for example, map information, road-junction/intersection data, node data, road data, picture data, destination/target-point data, guidance point data, detailed target data, target point read data, house/building shape data, and other information. Block 38b of information storage unit 37 is for storing therein a set of software program modules, which make use of road map information as stored in block 38c to execute navigation operations as required. Note here that the navigation execution program set in 38b is read by data TX/RX 39 from information storage unit 37 to be programmed into flash EEPROM 3 for later use. The remaining data may include, for example, guidance indication data, voice guidance data or schematic/abstractive guidance-route image data.

The information storage unit 37 may selectively store in block 38c the map information corresponding to a plurality of contraction scales and/or map information with the minimum scale. In the case where a map with a greater contraction scale is displayed on display unit 33, it is permissible that some information is partly subtracted or "thinned" from the map information of the minimum scale in data block 38c. For example, during display of the map information contraction scale of block 38c, the geographic distance of each road is reduced in scale while simultaneously causing indication mark/symbol information concerning one or several facilities to be partly subtracted therefrom.

3. Data Files of Data Block 38c in Storage Unit 37

Figure 2:
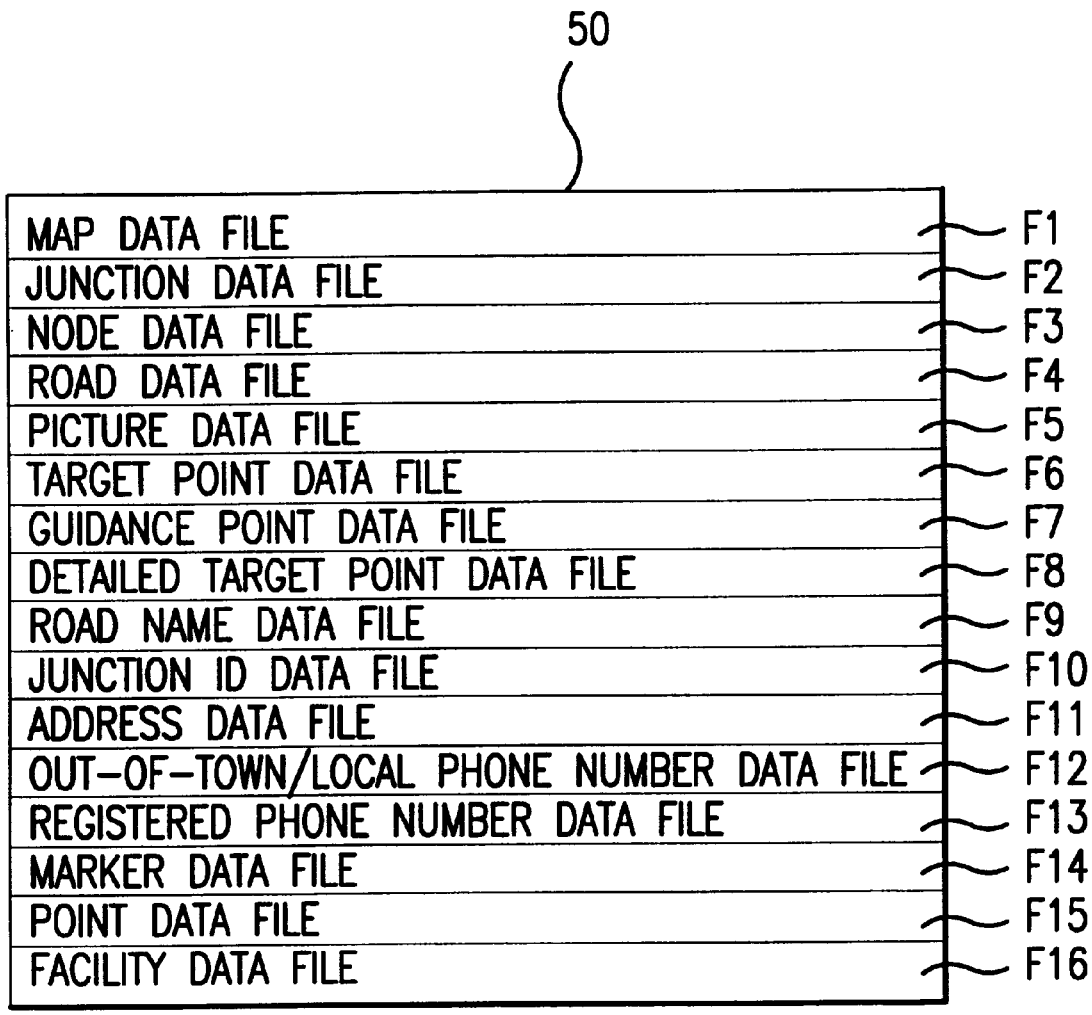
FIG. 2 is a diagram showing a data structure as stored in a data storage unit 38c of an information memory section 37 in the navigation apparatus.

FIG. 2 depicts a configuration of the data block 38c of the information storage unit 37 which consists of, for example, sixteen data files F1 to F16. The contents of these data files are as follows. The data file F1 is a map data file for storage of map information involving, for instance, national road maps, local road maps, and city/town maps. The data file F2 is for storing data as to road junctions or intersections each associated with geographic position coordinates and a title/name or identification (ID). Data file F3 contains geographic coordinate data of each node for use in a route search on a map. Data file F4 is a road data file which stores therein specific data representative of road/street positions, kinds and numbers of lanes along with connection relationship thereamong. Data file F5 is a photographic picture data file that stores therein picture image data of facilities and points of interest to visit or other places as required for visual presentation, such as major intersections.

The data file F6 is a target point data file that stores therein data as to specific places or facilities that will possibly be frequently searched. The places or facilities may be drivers' destinations or target points, including the major sightseeing places or buildings, and enterprises or cooperative offices as listed in public telephone directory books. Additionally, the data file F6 stores the locations of these places and the titles/names thereof. Data file F7 is a guidance point data file which stores guidance data regarding certain points under request for guidance, including the contents of road signs or public guidance indication plates and/or nodes. Data file F8 is a detailed target point data file which stores therein detailed data concerning the target points as stored in target point data file F6. Data file F9 is a road name data file which contains road-name data of major roads or streets as selected from among those stored in road data file F4. Data file F10 stores identification (ID) data of major junction points. Data file F11 stores address list data for use in searching for any desired target point as stored in data file F6 based on an address thereof.

An out-of-town/local phone number data file F12 stores therein data of only the out-of-town/local phone number of target points as stored in data file F6. A registered phone number data file F13 stores phone number data registered through an operator's manual operations, including phone numbers of interest such as those of business customers. A marker data file F14 stores data as to positions and IDs of characteristic points each serving as an eye-catch mark along a route and those of places of interest which are input through an operator's manual operations. A point data file F15 stores detailed data of the marker points as stored in data file F14. A facility data file F16 stores data concerning positions and associated explanation of any possible places the driver wants to stop excluding his or her presently intended target point. For example, the stopping point may be a gas station, a convenience store, or a parking area.

4. Facility Data File

FIG. 3 depicts a data structure of the facility data file F16 as stored in data block 38c of information storage unit 37. This file F16 contains therein information as to a preselected number of facilities SS(n). As described earlier, each facility may represent a target object set as the stop-at place. Facility data consists of a genre number SJN, latitude coordinate SNO, longitude coordinate SEO, mark number SPN, and name/title SN.

The genre number SJN indicates the genre to which a facility belongs. Where the facility of interest is an eating place such as a hamburger shop, its genre number indicates the category of "family restaurant/fast-food". In other words, the genre number SJN represents facilities organized into groups in accordance with the driver's objective of stopping at an intended facility. Genre number SJN may also contain additive data for identifying the kind, classification, genus, field, aim, use or business content of each facility, for example, a sightseeing place, recreation facility (involving a skiing ground, for example), gas station, department store or parking area. This data may be used to calculate geographic correlation information, for example, the distance between the vehicle and a presently selected target object, and the direction of such target object from the vehicle.

Each facility can be identified in geographical position on a map by use of a combination of the latitude and longitude coordinates SNO, SEO. An identification (ID) symbol of each facility is designated by the mark number SPN. This ID symbol means a mark that facilitates easy identification of the genre (business content) of each facility being presently selected when it is to be displayed on the screen. The determinate name/title of each facility is represented by the name/title identification SN. The determinate name/title refers to a widely recognized public name or title for identification, such as New York Municipal Office or Yankee Stadium.

5. Data Content of First RAM 5

FIG. 4 shows part of the data set as stored in the RAM 5. Present position data MP represents a present position of the vehicle which is detected by the present position detector 20 of FIG. 1. Absolute direction data ZD indicates the north-to-south direction to be obtained based on the information from absolute direction sensor 21. Relative direction data D$\theta$ is angular data indicative of an angle of the vehicle's running direction with respect to absolute direction data ZD. This relative direction angle (azimuth) data D$\theta$ is obtained based on the information from relative direction sensor 22.

Travel distance data ML represents the actual distance the vehicle has traveled, which is obtained from distance sensor 23. Present position information PI is data regarding a present position, which may be entered by way of either beacon receiver 26 or data TX/RX 27. VICS data CD and ATIS data AD are those input from either beacon receiver 26 or TX/RX 27. Utilizing VICS data VD may enable execution of error correction on the vehicle's position as detected by GPS receiver 25. Also, using ATIS data AD permits proper identification of traffic regulation and traffic density in an area of interest.

Registered target point data TP contains data as to a driver's registered target points along with the coordinate position and name/title thereof. Guidance start point data SP includes the map coordinate data of a specific point at which the navigation operation gets started. Similarly, final guidance point data ED contains the map coordinate data of a point whereat the navigation operation is terminated.

Guidance start point data SP may make use of coordinates of a node on a guidance road that is the nearest one to either the vehicle's present position or the start point. The reason for storage of such guidance start point data SP is that a present position of the vehicle will not necessarily be on the guidance road, and the present position may happen to be in an area or site off from the road. Regarding final guidance point data ED, the coordinates of the nearest on-the-road node to a corresponding registered target point TP is stored therein. The reason for storage of such data ED is that the coordinates of registered target point data TP will possibly be absent on the road.

Guidance route data MW as stored in the first RAM 5 is data expressly indicating an optimal or recommended route leading to a target point, which route is obtained through the route search processing at step SA4 to be described later. Note that each road on the road map stored in data block 38c of information storage unit 37 is added with a corresponding road number being inherent thereto. Guidance route data MW is constituted from an array of road number data groups covering from guidance start point data SP to final guidance point data ED, as will be discussed later.

Mode set data MD is the data adaptable for use in a target facility setting procedure to be described later. Mode set data MD is settable by use of the touch-switch panel 34 as shown in FIG. 1. Mode content being displayed on display unit 33 may be selected using mode set data MD.

Beep point data BP contains therein set data as to a stop-at facility as selected by a nearby facility processing as will be explained later. Similarly, search facility number GB(n) stores therein the identification (ID) number of a respective one of a plurality of facilities as presently searched by the nearby facility processing. The ID number may correspond to a variable n in facility data file F16. Facility-to-target point distance data Zn stores therein a distance from each facility designated by its search facility number GB toward final guidance point data ED along the guidance route thereof. The facility-to-target point distance Zn will be described in more detail later in connection with its accompanying flow diagrams.

Vehicle-to-facility distance data Wn stores therein a distance value as calculated at an along-the-path facility display processing step to be discussed later. The vehicle-to-facility distance Wn represents a relative distance from a present position of the vehicle to the facility. Vehicle-to-facility distance Wn will be used when a list of stop-at facilities located along the guidance route is visually indicated on the display unit 33. Right/left data RL indicates whether each extracted facility is on the right hand or the left hand side with respect to either the guidance route or vehicle's present position. Specifically, right/left data RL points out on which (right or left) side each extracted facility is present as long as the vehicle has moved forward in the direction of the target point along a guidance route.

6. Road Data

Figure 5:
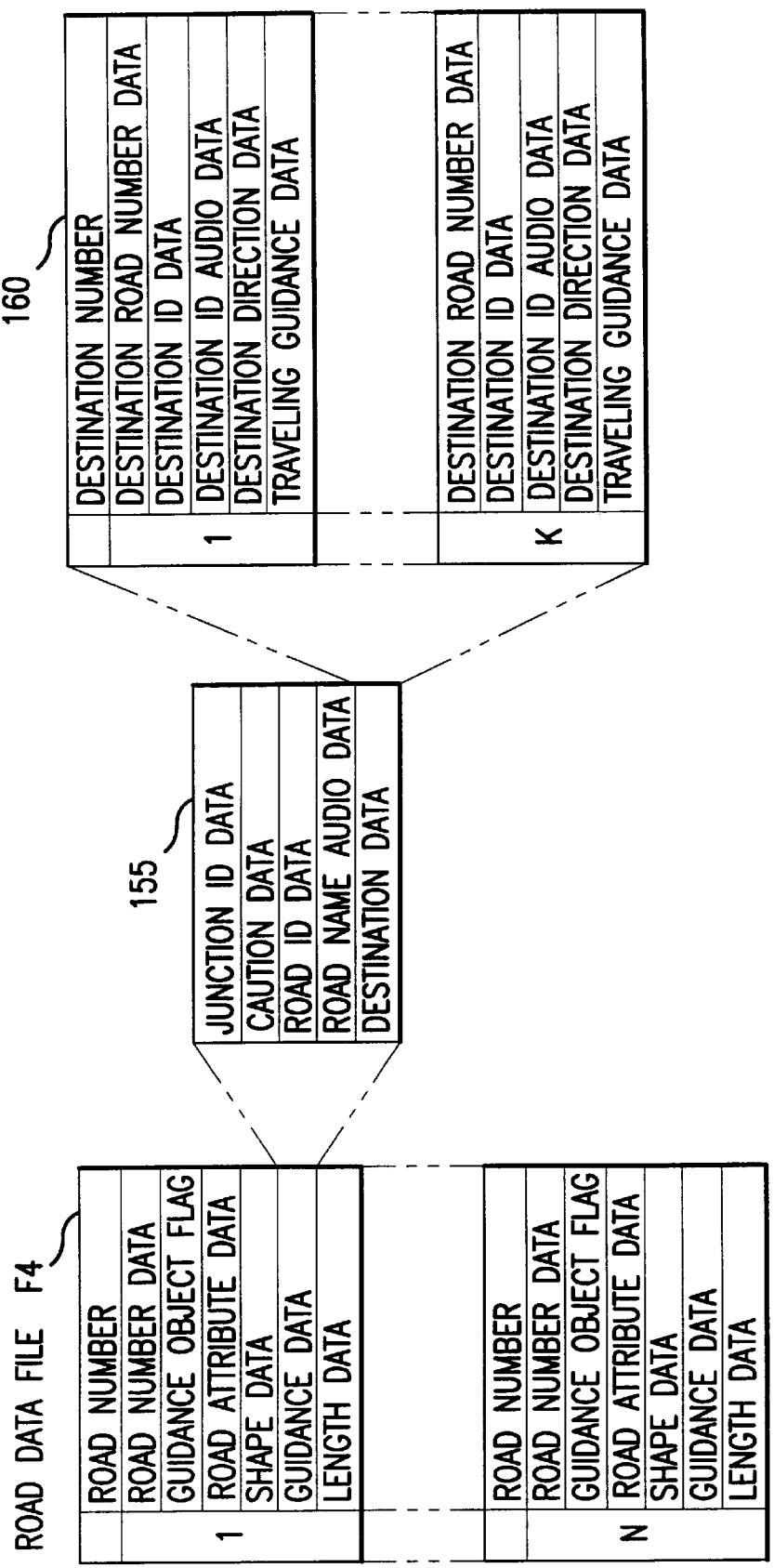
FIG. 5 is a diagram showing the structure of a road data file F4.

FIG. 5 shows part of the road data included in the road data file F4 stored in information storage unit 37. This file F4 contains information as to all of the roads or streets that are present within a range and are larger than a predefined width. Letting the number of roads contained in road data file F4 be "n", the road data concerning each n road consists of road number data, guidance object flag, road attribute data, shape data, guidance data and length data.

The road number data are ID numbers assigned to each road. Each road has a different number for each direction. The guidance object flag is a "1" when it is a guidance object road, or a "0" when a non-guidance object road. Note here that the "guidance object road" refers to a relatively wide road having width greater than a predetermined width, such as trunk roads or local roads/streets. The guidance object road is selectable as a route search object during navigation operations. The "nonguidance object road" refers to a relatively narrow street or path such as footpath, alley or lane, which will not act as any object under route search.

The road attribute data is representative of road attributes involving, for example, an elevated road or "overpass," an underground road or "underpass," highway, or turnpike. The shape data represents the shape of each road by storage of coordinate data of a road start point, a road termination point, and a node between the start and termination points.

The guidance data consists of road-junction or intersection ID data, caution data, road ID data, road name audio data and destination data. The junction ID data may represent the name or title of an intersection which acts as the termination point of a specified road. The caution data is representative of caution or notice at a point on the road, such as a railroad crossing, tunnel entrance, tunnel exit or road-width reduction point. The road name audio data is audio data indicative of road names for use in audio/voice guidance.

The destination data is information regarding one or several roads connected to the termination point of a road and consists of k destination points. Each destination data consists of destination number, destination road number data, destination ID data, destination ID audio/voice data, destination direction data and run guidance data.

The road number of a destination point is indicated by use of the destination road number data. The name/title of a destination road is indicated by the destination ID data. The destination ID audio data contains audio data as required to attain voice guidance. The destination direction data is used to show the direction in which the destination road extends. The traveling guidance data contains guidance data for providing guidance approach to an intended destination road, which guidance may include voice speeches "change to the right lane", "change to the left lane", or "continue running in the center lane." The length data is indicative of the length from the start and termination points of a road, the length from the start point to each node, and the length between adjacent nodes.

7. Overall Control Procedure

Figure 9:
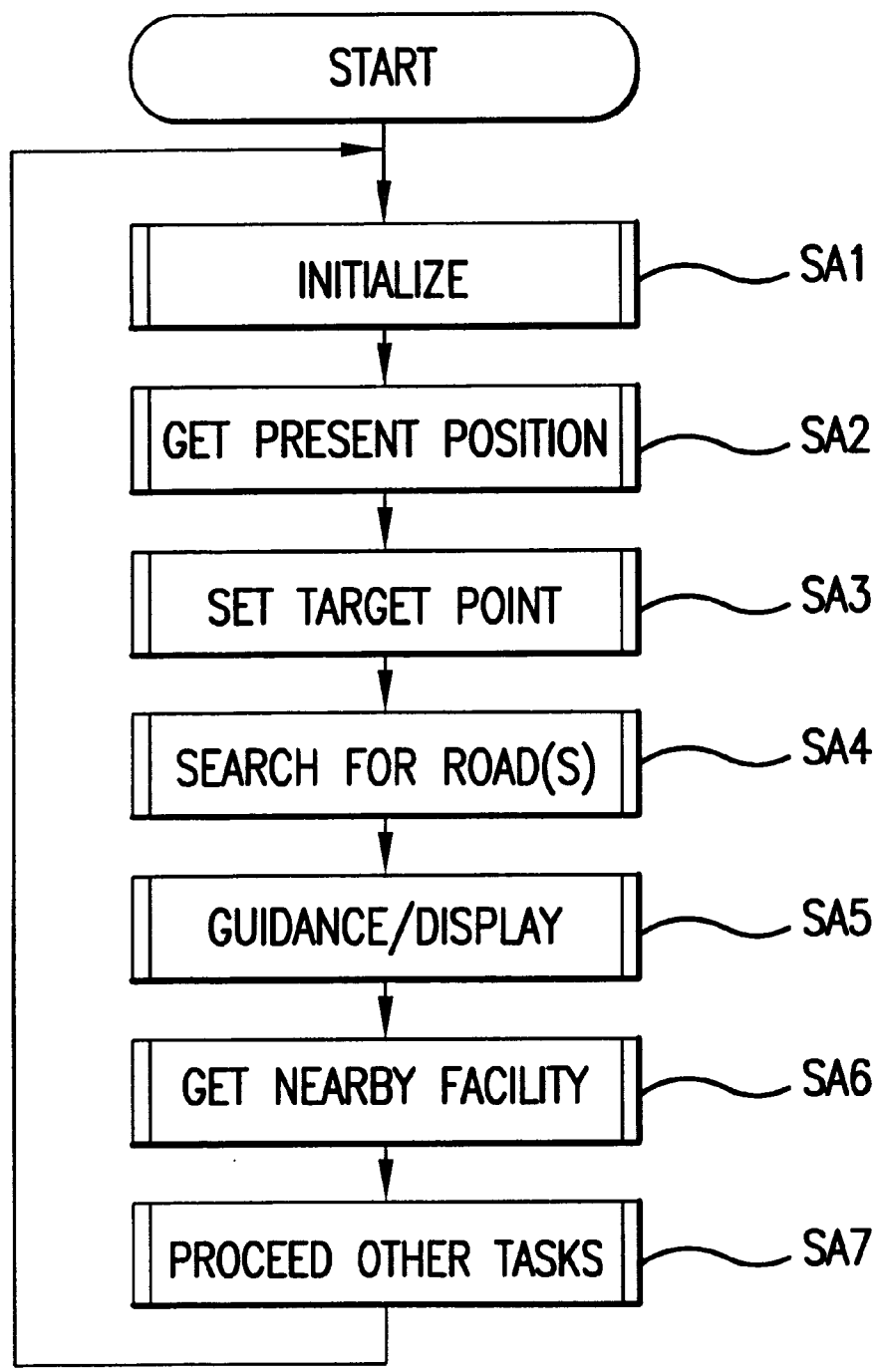
FIG. 9 is a flow diagram of the main control procedure of the navigation apparatus.

FIG. 9 shows a flowchart of the overall control processing procedure to be executed by the CPU 2 of the navigation system embodying the invention. This procedure gets started upon power-up and will end when power is turned off. The turn-on/off of power may be done in response to the on/off of the navigation system per se or of an engine start key (ignition switch).

The control procedure of FIG. 9 goes to step SA1 for execution of an initialization processing as follows. First, an associated navigation software program is read out of the data block 38c of information storage unit 37 causing a copy thereof to be loaded into flash EEPROM 3. The loaded program in EEPROM 3 is then executed. Next, CPU 2 attempts to erase or "clear" the general-purpose data storage area in each of the associative RAMs, including the work memory of RAM 5 and VRAM 10.

Subsequently, the procedure of FIG. 9 executes cyclically a series of processing tasks as defined at the steps that follow: a present position processing step SA2, target point set processing step SA3, route search processing step SA4, guidance/display processing step SA5, nearby facility processing step SA6, and other task processing step SA7. While there is no alternation of target point or no removal of the vehicle from a presently guided route, the steps SA3, SA4 will not be carried out in an overlapped manner.

When control goes to step SA2, CPU 2 attempts to detect the geographic coordinates (longitude, latitude, and height) of the vehicle as a ground mobile object with the navigation system built therein. This may be accomplished by receiving signals transmitted from a plurality of GPS satellites each of which is in an orbit around the Earth. Based on radio waves from respective satellites, the coordinate position of each satellite, the radio wave transmission time at each satellite, and the radio wave reception time at the GPS receiver 25 are sensed. The resulting information may be used to determine by appropriate computation the exact distance between the vehicle and each satellite. The resultant satellite distance data is then used to compute the coordinate position of the vehicle thus acquiring a present position thereof on a real-time basis. The acquired vehicle's present position is stored in the first RAM 5 as the present position data MP. Occasionally, the present position data MP can be partly modified or changed depending upon the information as input from beacon receiver 26 or data receiver 27.

Also at the present position processing step SA2, the absolute direction data ZD, relative azimuth data Dθ and travel distance data ML are calculated by use of the absolute direction sensor 21, relative direction sensor 22 and distance sensor 23 shown in FIG. 1. Data ZD, Dθ, ML are then used to perform arithmetic processing for specifying a present position of the vehicle. The vehicle's resulting present position is then compared with the map information being stored in data block 38c of information storage unit 37 to be suitably corrected as necessary to ensure that the present position is accurately displayed on the map screen. With such correction, it becomes possible to attain accurate computation of the vehicle's present position even when the vehicle happens to be in a tunnel disenabling proper reception of any GPS signals.

At the target point set processing step SA3 shown in FIG. 9, the geographic coordinates of a target point as desired by the operator are set as the registered target point data TP. For example, such data is designated by the operator who sets the coordinate position of his or her desired target object while looking at a road map or city map being presently displayed on the screen of display unit 33. Alternatively, such target object may be identified by the operator by selection from an item-based list of target object candidates to be displayed on display unit 33. Upon completion of the operator's designation of one specific target point, CPU 2 controls RAM 5 causing it to store the information data of target object's geographic coordinates as the registered target point data TP.

At the route search processing step SA4 of FIG. 9, an appropriate or optimal route is searched for which extends from the guidance start point indicated by data SP to the final guidance point represented by data ED. Here, the "optimal route" refers to a recommended or best suited route that enables the vehicle to approach the target point at the minimum time period and/or with the minimum distance; alternatively, the optimal route may refer to a route allowing the driver to use wider roads or streets at increased priority. Still alternatively, on occasions where the driver wants to use a highway, the optimal route will be a route allowing the vehicle to arrive at the target point at the minimum time period and/or with the minimum distance while including the specified highway therein.

The guidance start point data SP allows either the same data as the present position data MP or the node data of a certain guidance object road near the present position data MP to be set therein. In the situations that the vehicle's detected present position is out of the guidance route, another optimal route will be searched automatically. The new route will connect between a present out-of-route position and the last guidance point. It remains possible that when a temporal stop-at place is set as will be described later, the guidance route is modifiable so that it is replaced with a route that passes through such stop-at place.

At the guidance/display processing step SA5 in FIG. 9, the resulting guidance route as obtained by the route search processing at step SA4 is displayed on the screen of display unit 33 while letting the vehicle's present position be centrally indicated thereon. The visual indication of such guidance route on display unit 33 is carried out to ensure that the same remains identifiable on an associated map display on display unit 33. In addition to this, the navigation system is designed to allow guidance information to be audibly generated from speaker 13 in the form of human speech or to be temporarily displayed on display unit 33 if required, thus facilitating reliable travelling of the vehicle along the guidance route as presently recommended. Additionally, image data for display of such guidance route is performed by use of either the road map information in the vicinity of a present position as stored in the data block 38c of information storage unit 37, or city map information near the present position.

Selective switching of the road map information and city map information may be performed depending upon the conditions that follow. For instance, the two kinds of data may be switched from one to the other depending upon: the distance from the present position to the guidance point (the target point, stop-at place or intersection), the velocity of the vehicle, the size of the displayable area, or operator's switch operations. Further, in the vicinity of the guidance point (the target point, stop-at place or intersection), an enlarged map near the guidance point is displayed on display unit 33. This may alternatively be modified so that a schematic guidance route image is displayed on display unit 33, which image indicates (in the alternative of such road map) only a minimal amount of information as to the direction of the guidance route and the target point or stop-at place and a present position. This is accomplished by not displaying any geographic information.

After completion of the guidance/display processing at step SA5, the procedure of FIG. 9 goes to the nearby facility processing step SA6 and then to the other task processing step SA7. The nearby facility processing at step SA6 detects and designates any stop-at place (facility) other than the registered target point data TP. This process will be described in detail later.

The "other task processing" at step SA7 is for making a decision as to whether the vehicle's running position is along the guidance route as presently suggested based on computations. This step is also for determining if an instruction to alter the target point is entered through the operator's switch operations. After completion of step SA7, the procedure is then looped back to the present position processing step SA2. Thereafter, the aforesaid steps SA3 through SA7 will be repeated. Furthermore, when the vehicle has arrived at the target point, the route guidance/display processing step is terminated causing the procedure to go back to step SA2 again. In this way, the series of processing tasks from steps SA2 to SA7 will be repeatedly executed in a step-by-step manner.

8. Nearby Facility Processing

The nearby facility processing searches for and selects any stop-at facility the driver prefers to visit other than his or her final target place. The "stop-at" facility may be a gas station on occasions where the vehicle needs refueling on the way to the target place. Depending upon circumstances, the stop-at facility will alternatively be a restaurant, a bank, or other facilities, rather than the gas station.

Figure 10:
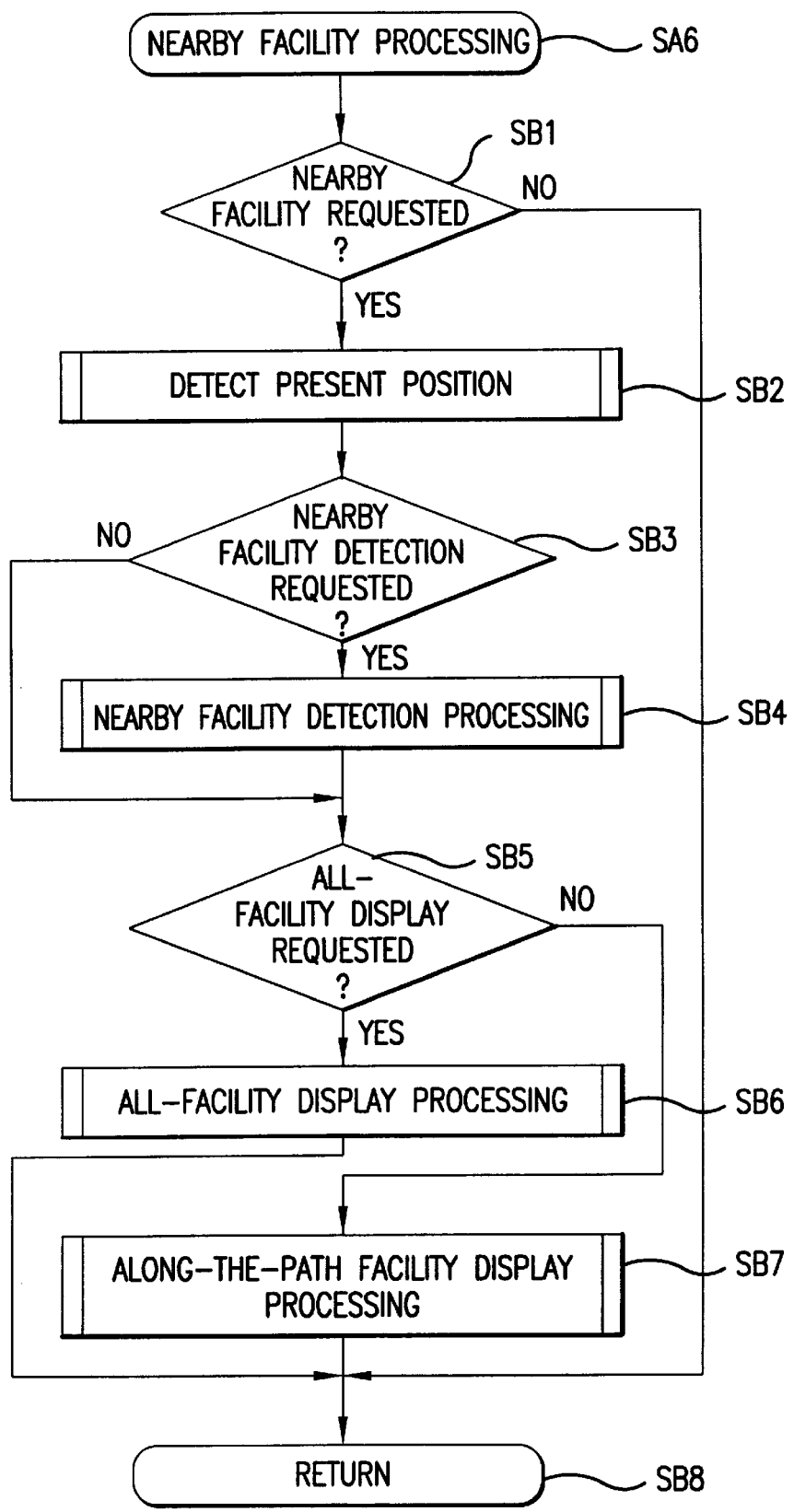
FIG. 10 is a flow diagram of a nearest-facility processing routine.

FIG. 10 shows a flowchart of one subroutine associated with the nearby facility processing step SA6 of FIG. 9. First, step SB1 determines whether a request for a particular nearby facility is made by the operator's operations of touch panel 34 of FIG. 1. If no such request is made, i.e., when the answer to step SB1 is NO, the subroutine skips the intermediate steps to go directly to step SB8 whereat control returns to the main procedure routine of FIG. 9. On the other hand, if the answer to step SB1 is YES, the subroutine goes next to step SB2 followed by steps SB3 to SB8 as will be described below.

At step SB2, a present position detection is performed, which may be similar to that of step SA2 in that the geographic coordinate position of the vehicle is determined based on the output information of respective sensors 21–24 in present position detector 20 of FIG. 1.

Then, control goes to step SB3 to determine if a request for detection of nearby facilities has been inputted by the operator. At this step SB3, the answer YES is issued even when no nearby facilities have been searched in the past. Accordingly, in the situation that the operator makes a search request for detecting nearby facilities, the subroutine goes next to step SB4 for conducting such a search. If NO is determined at step SB3, the subroutine skips step SB4 to enter step SB5 for determination of whether all facilities are requested for visual indication on display unit 33.

At step SB5, it is determined whether a display request is inputted by the operator with respect to all the facilities available. If YES to step SB5, an all-facility display processing task is executed at step SB6. If NO at step SB5, the subroutine goes to step SB7 for execution of along-the-path facility display processing. After completion of step SB6 or SB7, the subroutine of FIG. 10 returns at step SB8 to the main control procedure shown in FIG. 9.

The "all-facility display" processing at step SB6 refers to a task for displaying all of the stop-at facilities being presently searched. The "along-the-path facility display" processing at step SB7 is for extracting from all the facilities only facilities located along the guidance route as searched at step SA4 and for displaying the same. The extracted facilities may be any target, involving, for example, a point, location or facility as set by the operator.

The all-facility search processing is designed to conduct a search with respect to the entire region of the associated map information corresponding to an inputted target object, irrespective of the route as presently suggested, and then to display the resultant facilities. The way of displaying may vary depending upon situations: marks indicative of the facilities searched are superimposed and displayed at corresponding coordinate positions thereof on a map image displayed on display unit 33; or alternatively, there may be displayed a list of facility data for each facility consisting of a distance from the present position and/or a direction relative to the present position.

It should be noted that for the first display method which superimposes the marks indicative of facilities onto the map image, it remains possible that such facility marks continue to be displayed on the map even when the display scrolls in accordance with cursor movement or with movement of the vehicle's present position.

9. Nearby Facility Search Processing

Figure 11:
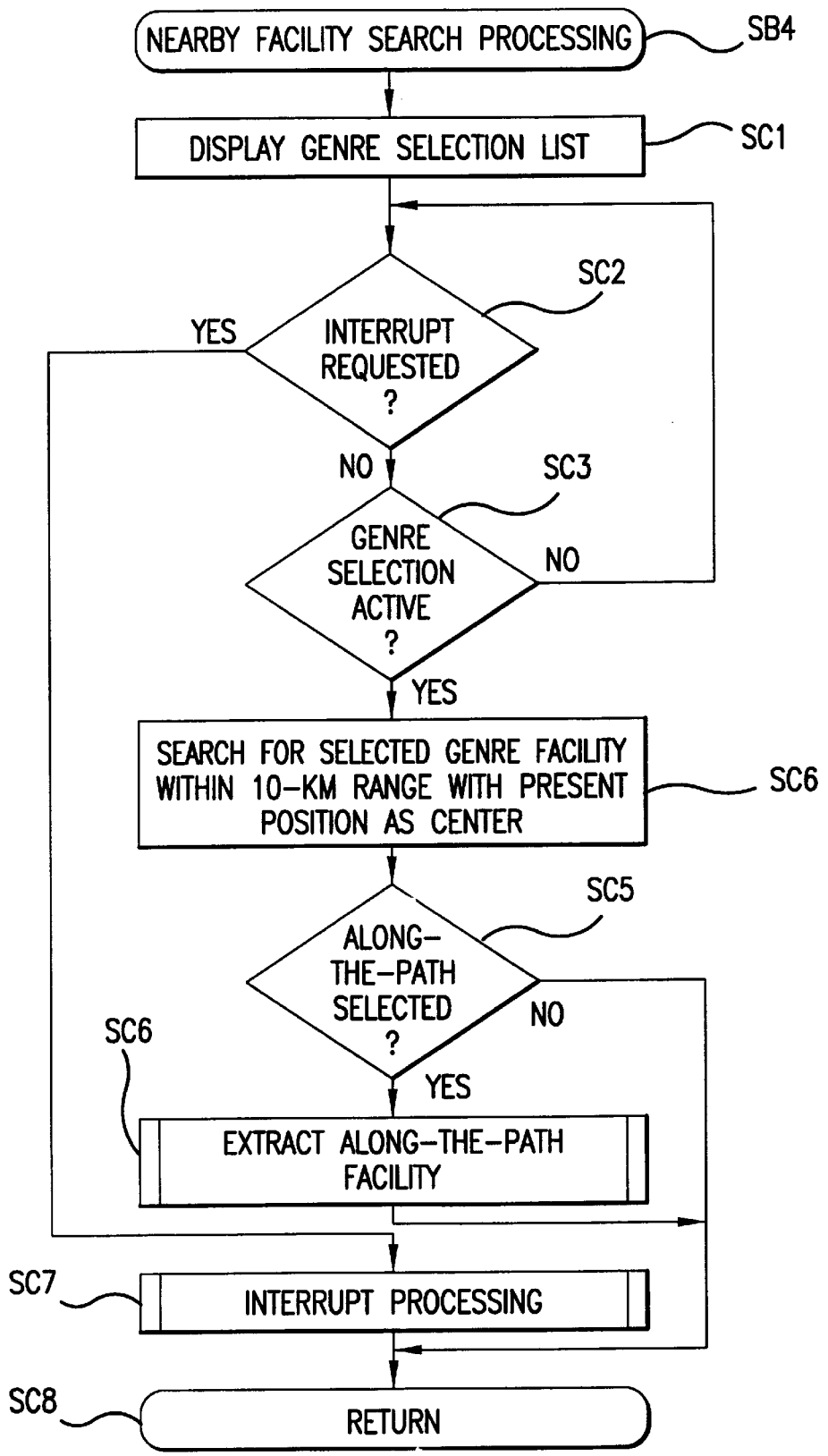
FIG. 11 is a flow diagram of a nearest-facility searching routine.

FIG. 11 shows a subroutine associated with the nearby facility search processing at step SB4 of FIG. 10. First, at step SC1, a genre selection list is displayed. The "genre selection list" represents the kind of genre to which each facility of the facility data file F16 belongs. Accordingly, based on this genre list, any suitable genre that meets the stop-at purpose may be selected by the operator.

Figure 18:
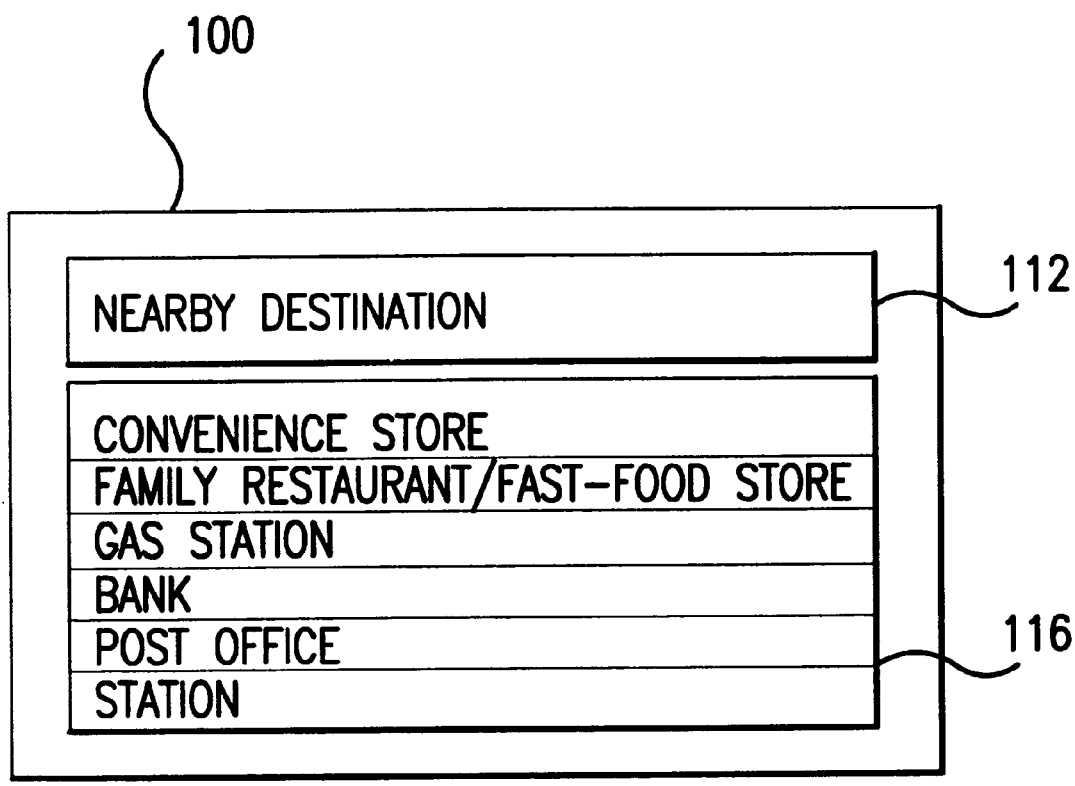
FIG. 18 is a diagram showing an exemplary indication of a list of genre selections for use in searching for an aimed facility.

FIG. 18 depicts an exemplary genre list to be displayed on the display unit 33. As shown, the names/titles of respective genres (here, for example, a convenience store, family restaurant, gas station, bank, and post office) are indicated in a corresponding column 116 on a screen 100.

Returning to FIG. 11, after completion of genre list displaying task at step SC1, the subroutine goes next to step SC2 for determining if an interrupt request is made. If such request is present, that is, when the answer to step SC2 is YES, an interrupt processing is executed at step SC7. The "interrupt processing" may be termination of the nearby facility search processing, for example. The interrupt processing is also necessitated on occasions where an expected operation of selecting the genre from the list displayed at step SC1 is kept inactive for a predetermined time duration.

When no interrupt request is found at step SC2, i.e., if the step SC2 determination is NO, the subroutine goes to step SC3 to determine if the operator's genre selecting operation is present. If NO, the subroutine is looped back to step SC2 for repeated execution of interrupt-request determination again. If YES is determined at step SC3, the subroutine goes next to step SC4.

When a genre is designated through the decision at step SC3, more than one facility which belongs to such genre and falls within a predefined range of, for example, a 10-km radius with regard to the present position of the vehicle, is then searched from the facility data file F16 at step SC4. In other words, only the facility(ies) belonging to the designated genre will be searched from respective facilities in data file F16. Simultaneously, the geographic linear distance relative to the vehicle's present position is calculated by use of the latitude coordinate SNO and longitude coordinate SEO of each of the facilities searched.

Then, an associated number of each facility having its computed linear distance within the 10-km range, namely, the identification number of each facility contained in the facility data file F16, is stored in the first RAM 5 as a search facility number GBn. Next, at step SC5, a decision is made as to whether the presently searched facilities are subject to a further limited search under more strict screening conditions to extract, for instance, only the facilities as located along the route. In other words, a decision is made as to whether the operator has instructed the system to extract from the resulting searched facilities the specific "along-the-path" facilities located along the guidance route.

When such "narrowing" of facilities is designated, i.e., if YES at step SC5, the subroutine goes to step SC6 for execution of extraction of such along-the-path facilities only. When the narrowing search for along-the-path facilities is not designated, i.e., if NO is determined at step SC5, the subroutine is forced at step SC8 to return to the main procedure of FIG. 9. This is also done upon completion of the along-the-path facility extraction at step SC6.

10. Extracting Along-The-Path Facilities

Figure 6:
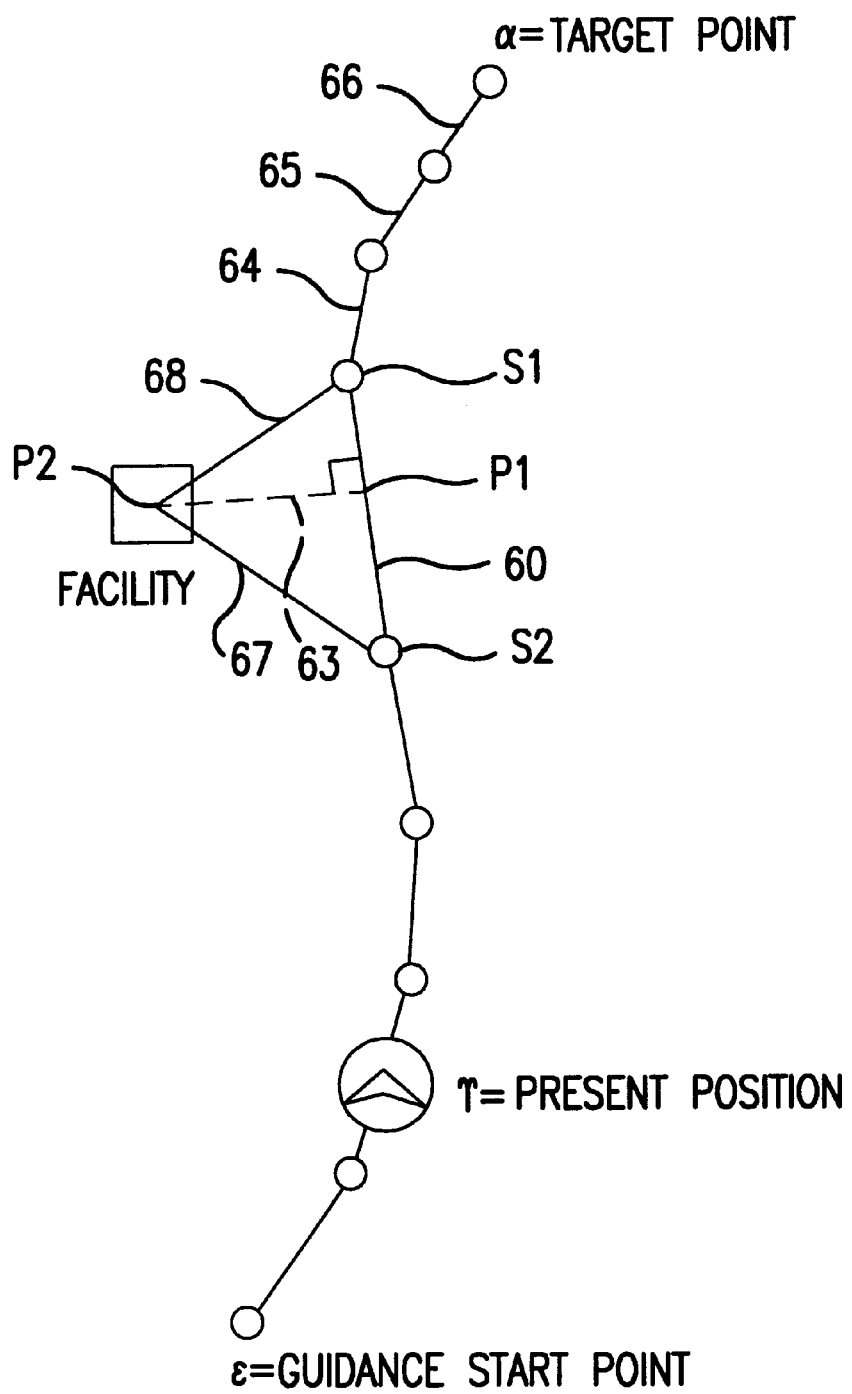
FIG. 6 is a diagram showing a positional correlation of a guidance route and a facility.

FIG. 12 shows a subroutine of the along-the-path facility extraction processing at step SC6 of FIG. 11. This subroutine of FIG. 12 begins with step SD1 which calculates a geographic minimum linear distance from each facility to the guidance route based on the geographic coordinate data of each facility as searched at step SC4. An associated subroutine with this minimum linear distance calculation is separately shown in FIG. 13. The "guidance route" refers here to the guidance data MW as obtained by the route search processing in the main procedure shown in FIG. 9. FIG. 6 is a diagram for explanation of the positional relation of any detected facility and the guidance route. The route from the guidance start point ε toward the target point α is the route as obtained by the route search processing at step SA4 of FIG. 9.

At step SD2 of FIG. 12, only specific facilities are extracted each of which falls within the resultant minimum linear distance of about 150 m as obtained at step SD1. Each facility extracted at step SD2 is then subject at step SD3 to a subsequent determination as to on which side, i.e., on the right side or the left, the facility is located with respect to the vehicle's running direction along the guidance route.

Figure 7:
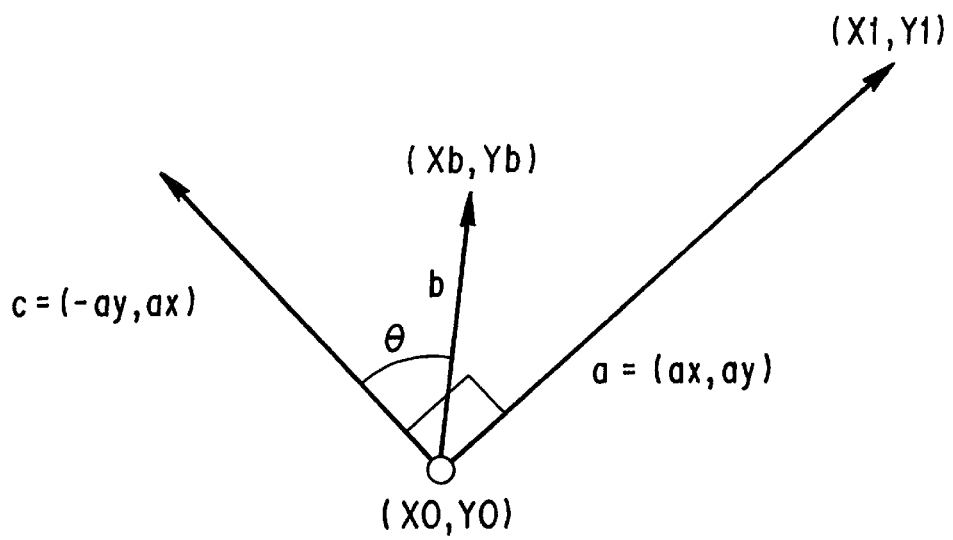
FIG. 7 is a diagrammatic representation for explanation of right/left position detection of each facility with respect to the route-travel direction.

FIG. 7 is a presentation of a model for use in explaining how the processing at step SD3 is carried out. Coordinates (X1, Y1) represent a node near a certain facility with its own coordinates (Xb, Yb), and corresponds to a node S1 shown in FIG. 6. Reference coordinates (X0, Y0) may correspond either to a node S2 of FIG. 6 or to a present position of the vehicle. Consequently, a reference vector a=(ax, ay) connected between the coordinates (X1, Y1) and reference coordinates (X0, Y0) represents a branch 60 shown in FIG. 6. Here, the reference vector a satisfies: a=(ax, ay)=(X1-X0, Y1-Y0). The coordinates (X1, Y1) and reference coordinates (X0, Y0) are selected so that they are identical to those of a specific node nearest to the facility with the target coordinates (Xb, Yb).

For the reference vector a, an orthogonal vector c is defined which is rotated in the counter-clockwise direction to satisfy: c=(-ax, ay). Also defined is a target vector b that connects together the reference coordinates (X0, Y0) and a facility's target coordinates (Xb, Yb). The target vector b and orthogonal vector c internally define a vector space at angle θ therebetween. Note that the target vector b may be defined as: b=(Xb-X0, Yb-Y0).

The inner product of the reference vector a and target vector b is defined by:

$$c \cdot b = |c| \times |b| \times \cos\theta.$$

When the value of such inner product of vectors c, b is positive in polarity, it is determined that the facility of interest is on the left side of the running direction along the guidance route. In contrast, if the inner product is negative in polarity, the facility is determined to be on the right side of the running direction. In this way, at step SD3, the relative right/left position of any one of the extracted facilities with respect to the guidance route is exactly determined depending upon whether the vector inner product is positive or negative in polarity. This enables exact right/left direction of the target object to be easily achieved merely based on the plus/minus judgement of the calculation result of inner product. The right/left data RL thus judged is then stored in the first RAM 5. Additionally, assuming that there are two nearest nodes S1, S2 close in position to the facility under test, the reference coordinate point (X0, Y0) of FIG. 7 is selected because it is the node nearest the start point (e.g., the node S2 in the case of the illustrative example in FIG. 6). Conversely, the coordinate point (X1, Y1) is selected because it is the node nearest the target point (e.g., the node S1 in FIG. 6).

It should be noted that the orthogonal vector c may alternatively be rotated by 90 degrees in the clockwise direction with respect to the reference vector a; or still alternatively, it may be the outer product of reference vector a and target vector b, as defined by $$|a| \times |b| \times \sin\theta.$$

Once the right/left position of each extracted facility is detected with respect to the guidance route, the facility-to-target distance Zn indicative of the distance from each extracted facility to the target point is calculated at step SD4 of FIG. 12. The distance Zn is the one being measured along the guidance route. The distance Zn may refer to the along-the-path distance from point P1 toward target point α shown in FIG. 6. Accordingly, in the illustrative example of FIG. 6, the linear distance from point P1 to node S1 added with respective linear distances of branches 64, 65, 66 results in the facility-to-target distance Zn. Note that the reference vector a may be set to any one of the vehicle's running direction, the vehicle-to-target direction, the north, the south, the east, the west, and a direction as set by the operator. Note also that the facility-to-target distance Zn may alternatively be added with the minimum linear distance (as obtained at step SD1 of FIG. 12).

Based on the resulting facility-to-target distance Zn, the extracted facility data is sorted at step SD5 in FIG. 12. By way of example, they are sorted into a decremental sequence with the greatest in facility-to-target distance Zn coming first. Thereafter, the subroutine of FIG. 12 returns at step SD6 to the routine of FIG. 11.

11. Calculating Minimum Linear Distance

Figure 8:
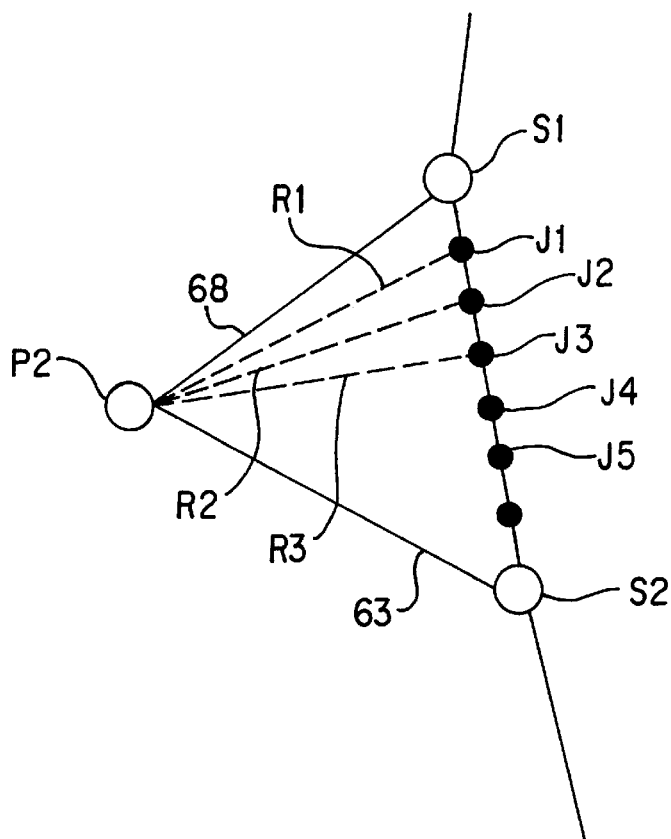
FIG. 8 is a diagrammatic representation for explanation of a minimum linear-distance calculation procedure of each searched facility and guidance route.
Figure 13:
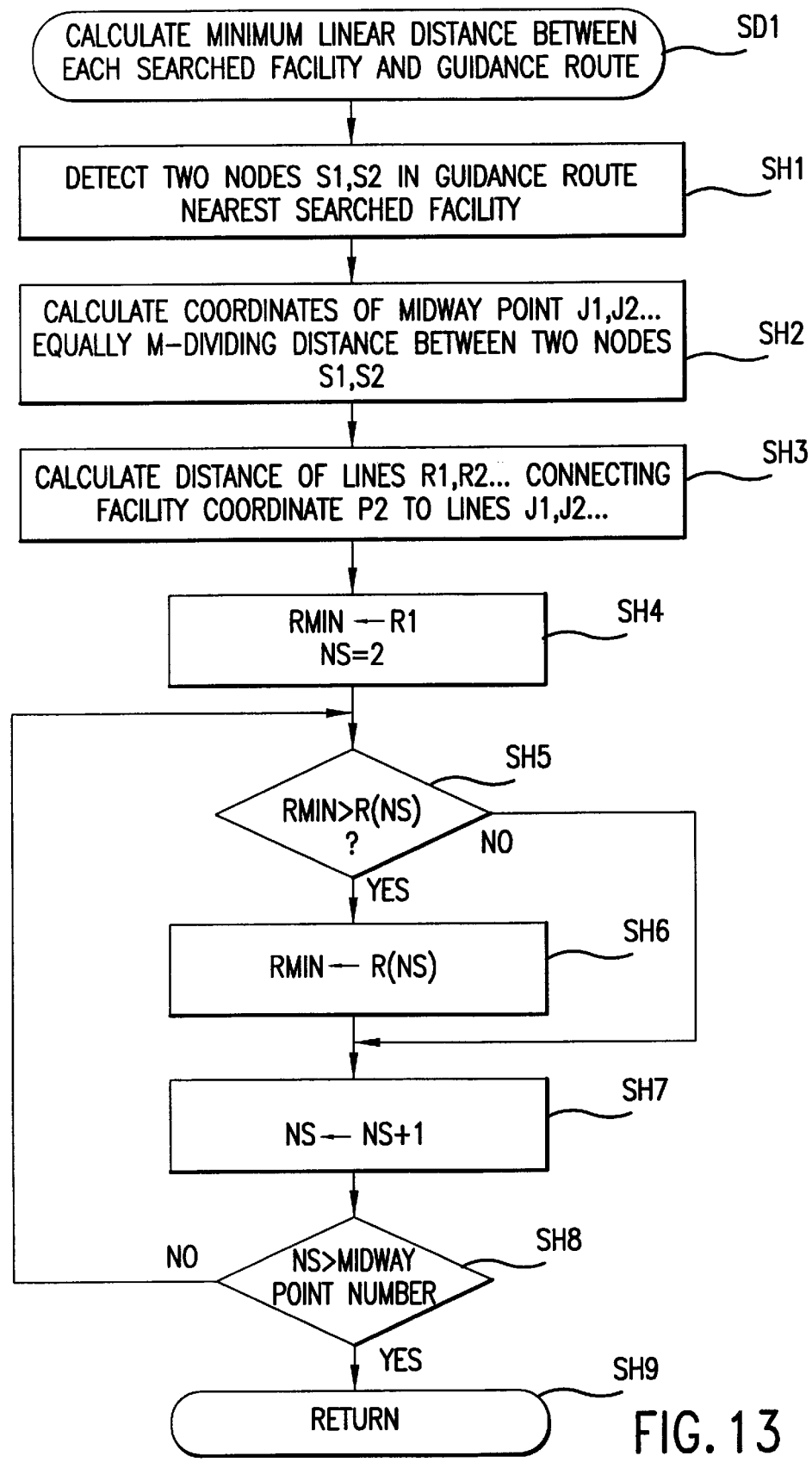
FIG. 13 is a flow diagram of a routine of the minimum linear distance between a facility and guidance route.

FIG. 13 shows a subroutine for minimum linear-distance calculation step SD1 of FIG. 12 which calculates the minimum linear distance between one searched facility and the guidance route. FIG. 6 is a diagram for explanation of the relative geographic positional relation between a facility located along the guidance route and the guidance route. FIG. 8 is a diagram for explanation of calculation of the minimum linear distance. As described previously, the route of FIG. 6 from the guidance start point ε to the target point α is the route as obtained by route search processing at step SA4 of FIG. 9.

Nodes S1, S2 shown in FIG. 8 correspond to those of FIG. 6. The geographic minimum linear distance between the coordinates P2 of one facility searched by the nearby facility search processing at step SB4 and the guidance route is calculated in a way that follows. First, at step SH1 of FIG. 13, two nearest nodes S1, S2 that are close in position to the subject facility are selected in the guidance route. Detection of such two specific nodes from among several nodes along the guidance route may be performed as follows: calculate a linear distance of each node to the coordinates of P2; find among the resulting distance values two specific values one of which is the minimum and the other of which is the second minimum; and, specify two nodes related to the first and second minimum values as the "nearest nodes" S1, S2 to the guidance route.

Then, the routine of FIG. 13 goes to step SH2 for calculating the coordinates of intermediate or "midway" points J1, J2, . . . which equally divides a line connecting the two nodes S1, S2 into m parts, based on the geographic coordinates of each node S1, S2. At step SH3, the m-division midway points J1, J2, . . . are subject to distance calculation for obtaining the geographic distance of each point Ji (i=1, 2, . . . ) to the coordinate P2 of the facility of interest. This distance is defined by the length of a corresponding line Ri connecting points Ji and P2.

Next, at step SH4, the distance value of line R1 is set to the minimum value Rmin as its initial value while letting a conditional variable NS be at "2" as the initial value thereof. At step SH5, the geographic distance of the NS$^{th}$ line R(NS) designated by the conditional variable NS is compared with the minimum value Rmin to determine which is greater in value. When the value of line R(NS) is greater than the minimum value Rmin, the answer to step SH5 is YES. If this is the case, the geographic distance value of line R(NS) is set to minimum value Rmin at step SH6. After execution of this value replacement, the conditional variable NS is incremented by one (1) at step SH7.

On the other hand, when the minimum value Rmin is less than the distance value of line R(NS), that is, if NO is determined at step SH5, the subroutine of FIG. 13 skips step SH6 and goes directly to step SH7. Subsequently, at step SH8, a decision is made as to whether the conditional variable NS is greater than the number of m-division midway points J on the node line S1–S2 of FIG. 8. If NO at step SH8, control is looped back to step SH5 repeating steps SH5 to SH8. If YES at step SH8, the routine returns at step SH9 to the routine of FIG. 12.

With the above control procedure, the minimum value Rmin is finally set at a specific value that is substantially equal to the minimum linear distance from the coordinates P2 of the facility of interest toward the node connection line S1–S2. This minimum value Rmin is thus used as the best possible facility-to-route distance Rmin between the facility and guidance route. This minimum value Rmin may be identical to a foot of a perpendicular from the target facility onto the node connection line S1–S2. Additionally, the minimum linear distance calculation processing may alternatively be carried out in such a way that the distance is obtained by mere calculation of a distance from node S1 or S2 to the target facility. However, this is less precise.

12. Along-The-Path Facility Display Processing

FIG. 14 shows a subroutine for the along-the-path facility display processing at step SB7 in FIG. 10. This routine begins with step SE1 which calculates a remaining run distance OP from the vehicle's present position to the target point. In this case, length data of the road data pursuant to the guidance route data MW is accumulated to provide an accumulated value, which is then added with a distance from the vehicle to a next node.

The "remaining run distance" OP refers to the actual distance where the vehicle has moved toward the target point along the guidance route as presently searched. Control goes next to step SE2 causing the facility-to-target distance Zn obtained at step SD4 of FIG. 12 and the remaining run distance OP to be subject to the calculation:

$$Wn=OP-Zn.$$

The resulting vehicle-to-facility distance Wn defines a relative along-the-path distance between a present position of the vehicle and each extracted facility along the guidance route. If the vehicle-to-facility distance Wn is negative in polarity, it is determined that the facility is a "past" position which is somewhere back toward the start point along the guidance route. After completion of the vehicle-to-facility distance Wn calculation, control goes to step SE3 to determine if a map display request is made. This step makes a decision as to whether direct map display is selected for each extracted facility (along-the-path facility).

When the map display is requested, that is, if YES at step SE3, control goes to step SE4 to temporarily designate a certain facility which has a vehicle-to-facility distance Wn which is positive in polarity and also is the closest. Additionally, step SE3 allows such temporarily designated facility to be displayed on display unit 33 of FIG. 1 along with the vehicle's present position at an appropriate contraction scale. On the map image displayed, any extracted facility is visually indicated by use of a corresponding mark that is predefined exclusively thereto. This mark may be designated using one of the mark numbers SPN as stored in the facility data file F16 shown in FIG. 2. If no map display is requested at step SE3, the subroutine jumps to the subroutine of FIG. 15, discussed later.

Continuing with along-the-path facility display processing of FIG. 14, after completion of map display at step SE4, control goes next to step SE5 to determine if any interrupt processing is requested. If YES at step SE5 (upon request of an interrupt), any kind of processing under request is executed at step SE6; then, at step SE7, the along-the-path facility display processing is terminated and the system returns to the subroutine of FIG. 10. The activation of interrupt processing, may also be triggered by the operator's selection remaining inactive for a predefined time duration.

When such interrupt request is absent, that is, if NO at step SE5, control goes to step SE8 to determine if a stop-at facility has been decided by the operator via the touch panel 34 of FIG. 1. If YES at step SE8, control skips to step SE12 which sets the decided facility as a beep point in such a way that the information as to the geographic coordinates of such facility are stored in the first RAM 5 as beep point data BP. The data BP is for later use in informing, by issuing audible information such as voice sound, the user of the fact that the vehicle is near the intended facility.

On the other hand, if NO at step SE8, control goes to step SE9 to determine if cursor movement operations are made. If YES at step SE9, control proceeds to step SE10 which causes a next facility to be displayed on the display unit in such a way that when the next facility is selected, a corresponding facility is designated which has the second greatest vehicle-to-facility distance Wn. At this step, it may happen that the operator's cursor operation indicates a "backward" instruction. If this is the case, certain facilities are sequentially designated from those located along the "past" route the vehicle has already traveled. The order of these facilities is such that those with the smaller absolute value of vehicle-to-facility distance Wn come first.

Then, at step SE11, facilities designated at step SE10 and the vehicle's present position are displayed on the display unit together with an associated map image. In this case, each facility is displayed on the right or left side of the guidance route pursuant to the right/left data RL. The display position of each facility is different from the map display in that any facilities are shown in the same column regardless of their actual distances from the guidance route while permitting association of corresponding audible output signals with the individual facility name/title and its relative position (i.e., "right" or "left"). As previously described, the guidance route may be the vehicle's running direction, the operator's set direction or other directions. During the facility's display at step SE11, associated characteristic marks are also visually indicated enabling easy identification of such designated facilities. The marks are designated by the mark numbers SPN.

When the answer to step SE9 is NO (no cursor operations), or after completion of displaying new facilities at step SE11, control is looped back to step SE5 for re-execution of this step and its following steps.

Figure 17:
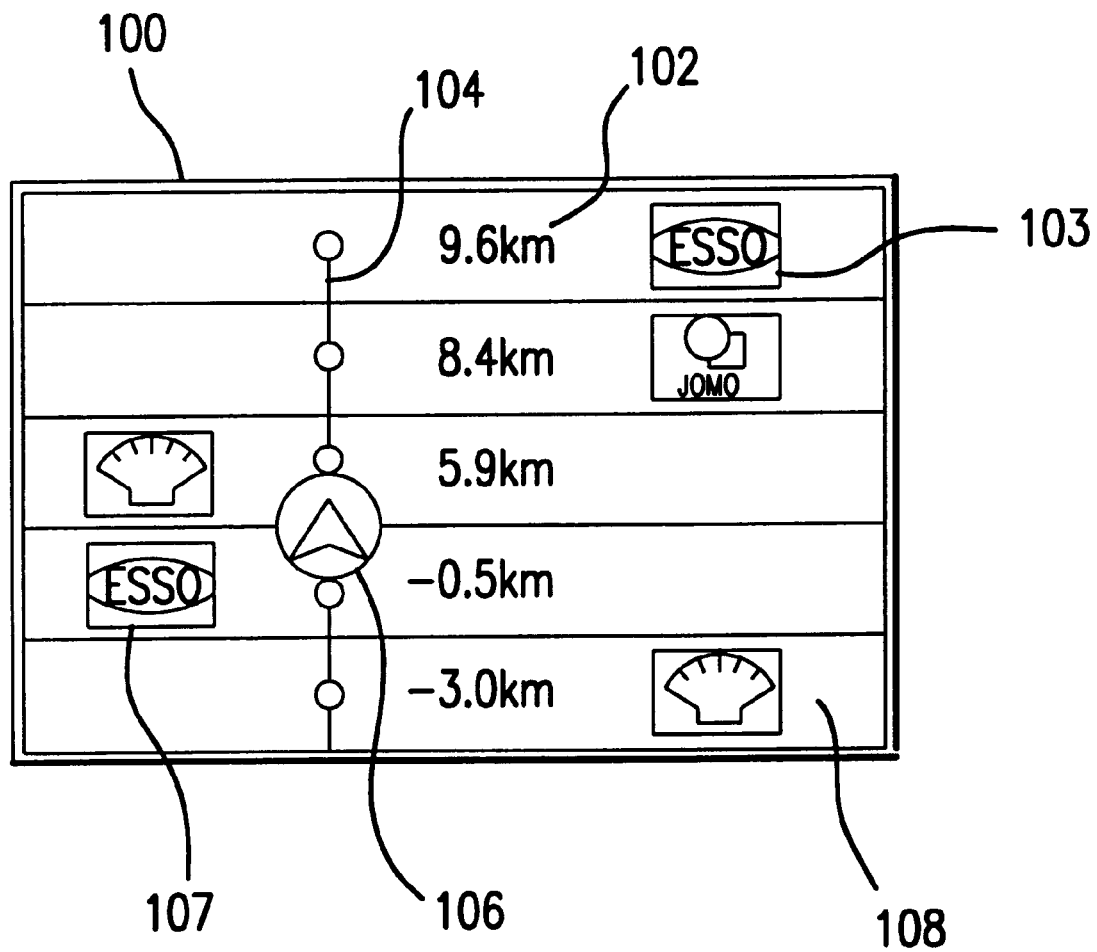
FIG. 17 is a diagram showing one exemplary indication of a list of facilities along the route.

Returning to step SE3, when the determination is NO (map display selection is inactive), control goes to another subroutine shown in FIG. 15. The subroutine of FIG. 15 is a program module for displaying a list of along-the-path facilities as presently extracted. This program begins with step SF1 which displays a list of respective facilities along with their vehicle-to-facility distance Wn as obtained at step SE2 of FIG. 14. FIG. 17 illustrates an exemplary facility list being indicated at step SF1. Line 104 of FIG. 17 denotes the guidance route, whereas symbol 106 indicates a present position of the vehicle.

A mark 103 represents one extracted facility accompanied with a numeric indication 102 of the vehicle-to-facility distance Wn thereof. Similar numeric indications are also given to other extracted facilities 107 and 108. A minus (−) symbol is used for distance indications 102 to show that a corresponding facility associated therewith is a "past" facility, located in the "backward" (already traveled) route of the vehicle. In addition, the relative display positions of facilities 103, 107, 108 with respect to the guidance route line 104 are specifically arranged so as to tell whether a facility is on the right side or the left side of line 104. For example, the facility mark 103 being displayed on the right side of line 104 informs the user that this facility is on the right-hand side of the guidance route, whereas the facility mark 107 displayed on the left side of line 104 tells that the facility is on the left-hand side. While not illustrated, the facility-to-route distance Rmin may also be displayed together with the vehicle-to-facility distance Wn. It will also be recommendable depending upon situations that the total distance Wn+Rmin be also displayed with respect to each facility. Additionally, the facility names/titles and associated distances may be output in the form of voice speech as electronically synthesized or playback signals.

After display of the facility list at step SF1, control goes to step SF2 to determine if an interrupt is requested. If YES at step SF2, a corresponding interrupt processing is made at step SF3 causing at step SF4 control to return to the main routine. The interrupt processing may also be required, for example, in case where the operator's selection operations remain inactive for a predefined time duration.

If NO at step SF2 (no interrupt request), control goes next to step SF5 which determines if stop-at facility selection is made by the operator via touch panel 34. If YES at step SF5 (selection is active), the selected facility is set at step SF8 as a beep point. Namely, information as to the geographic coordinates of such facility is stored as beep point data BP in the first RAM 5 of FIG. 1.

Then, at step SF9, both the facility selected at step SF5 and the vehicle's present position are displayed on the display unit 33 along with an associated map image. During the map display accompanying such facility(ies) at step SF9, a characteristic mark is used to render the selected facility visually identifiable. The mark is designated using the mark number data SPN.

Alternatively, if NO at step SF5 (facility selection is inactive), control goes to step SF6 to determine if any cursor activation is made. If YES, the list being displayed on the screen is scrolled at step SF7 in accordance with cursor operation. For instance, where display of frontal or "future encounterable" facility(ies) is requested due to the cursor activation operations, more than one additional facility having a greater vehicle-to-facility distance Wn is displayed. Referring to the example of FIG. 17, the display image is scrolled down in such a way that data regarding the last facility 108 is forced to disappear from the screen 100 causing data of a new facility(ies) to appear instead at the uppermost level of the screen. Conversely, if the operator's cursor operations indicates the "backward" instruction, the uppermost facility 103 disappears from screen 100 allowing one "past" along-the-path facility to appear at the lowermost level of screen 100.

Turning back to the routine of FIG. 15, if NO at step SF6 (no cursor movement), or after completion of scrolling of facility list display at step SF7, control is looped back to step SF2 for re-execution of the interrupt request determination step and its following steps.

As discussed earlier, when YES at step SF5, control goes next to step SF8 for setting a selected facility as a beep point, and then to step SF9 which may be similar to step SE11 of FIG. 14. Finally, control is forced at step SF10 to return to the control routine of FIG. 10.

13. All-Facility Display Processing

Figure 16:
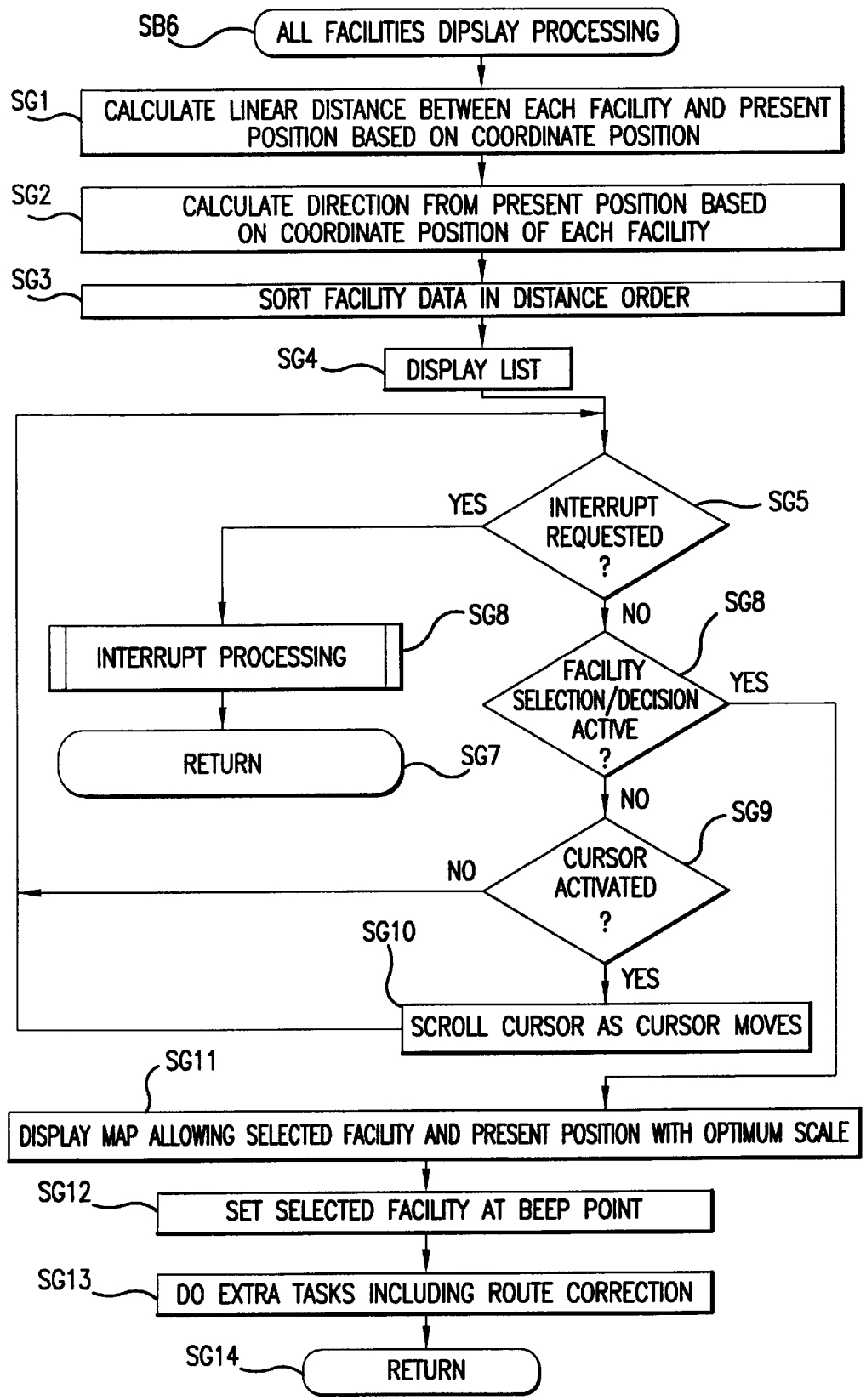
FIG. 16 is a flow diagram of a routine of indication of all of the facilities available.

FIG. 16 shows a subroutine program module associated with the all-facility display processing at step SB6 of FIG. 10. The subroutine of FIG. 16 begins with step SG1 which calculates the linear distance of the vehicle's present position to a respective one of searched facilities, namely, those searched for at step SC4 of FIG. 11 and fall within the 10-km range, by use of the geographic coordinate data of each facility. The "linear distances" here have no connection with the guidance route being presently searched. Then, at step SG2, the direction of each facility from the vehicle's present position is obtained based on the coordinate data thereof.

Control then enters step SG3 which attempts to sort a set of facility data items, based on the resulting linear distance data as obtained at step SG1, into a regular incremental sequence by using the distance values. Control goes next to step SG4, which displays a corresponding list on the display unit 33 while allowing the directions and distances to be indicated on a one-to-one correspondence basis. Each direction is displayed by use of either an arrow or a character set. The arrow may assume the upper side of the screen as the vehicle's running direction, whereas the character set may use a word such as "Northwest."

After the list display at step SG4, control goes to step SG5 to determine if an interrupt is requested. If YES, a corresponding interrupt processing is made at step SG6. The list display is terminated at step SG7 causing control to return to the main routine. As in the preceding cases, the interrupt processing may be required on occasions where the operator's selection operations remain inactive for a predefined time duration.

When NO at step SG5 (absence of interrupt request), control goes next to step SG8 to make a decision as to whether stop-at facility selection is made by the user. If YES at step SG8, a selected facility is displayed at step SG11 on the display unit 33 along with the vehicle's present position.

During the map display accompanying the facility(ies), it is required that the facility and vehicle's present position be visually indicated with an appropriate contraction scale permitting simultaneous display of the two on the display unit. In such facility display at step SG11 a characteristic mark is employed to render the selected facility visually identifiable. The mark is designated using the mark number data SPN. In this case, the name/title identification SN may also be displayed. Next, at step SG12, the selected facility is set as a beep point. In other words, information concerning the geographic coordinates of the once-determined facility is stored as beep point data BP in the first RAM 5. When required, depending upon circumstances, control goes to step SG13 which conducts another search to determine another possible guidance route containing the presently selected facility.

When NO at the preceding step SG8 (no facility selected), control goes then to step SG9 to determine if cursor movement is made. If YES at step SG9, the list being presently displayed on the screen is controlled at step SG10 to scroll upward or downward according to cursor movement. After completion of such scrolling of the list, or when NO at step SG9, control is looped back to step SG5 as shown in FIG. 16 for re-execution of related steps in substantially the same way as described previously.

After a specific facility is selected completing necessary route correction processing pursuant to the updated facility selection through steps SG12, SG13, control is caused at step SG14 to return to the procedure of FIG. 10. In this way, with the all-facility display processing subroutine shown in FIG. 16, facility search is conducted regardless of the guidance route in such a way as to determine more than one facility that falls within the "radius 10-km" range with the vehicle's present position as the center thereof. Note that the reference point for use in conducting an "all-direction facility" search will not exclusively be limited to the vehicle's present position. For example, the all-direction facility search may be carried out with a certain "past" position of the vehicle (such as the vehicle's start point) as a reference, thereby permitting visual indication of the distance to each facility from the vehicle's position on the way of travel along the guidance route.

More specifically, with the invention, the reference point adaptable for use in extracting along-the-path facilities or in conducting an all-direction facility search should not be exclusively limited to the vehicle's present position. The search reference point may alternatively be either one of the following: a target point set before the vehicle begins running; a pass-through point or transit node on the optimum route toward the target point, such as an intersection or a characteristic building; a given point in a map image on the display unit 33 as designated by the operator; or a point on the optimum route presently displayed on display unit 33, for example, an intersection or building. Also, the search conditions as employed in the nearby facility search processing made at step SC4 of FIG. 11 should not be limited exclusively to the surrounding 10-km range: such range may be broadened or narrowed, or may be maximized to cover the entire area of an associated map as necessary. Similarly, the extraction conditions as employed at step SD2 of FIG. 12 is also not limited to 150 m. It may be extended or shortened if needed.

The stop-at facility selection processing in the illustrative embodiment may be modified such that more detailed information is additionally displayed for respective facilities. Alternatively, it may be modified to permit a narrowing search for more exact facilities based on detailed information. By way of example, assuming that the designated genre is a restaurant, there will be displayed specific information as to practical menu items, such as Japanese, western, or Chinese, thereby allowing the search to be further narrowed in field pursuant to the kind of food in such menu items.

It should be noted in step SC4 of FIG. 11 that exact indication of the coordinates of each facility may be deleted if appropriate. For example, where the road has a median strip and there is a "no right turn" prohibit sign at an associated intersection, right-side neighboring facilities may also be withdrawn from consideration. In this case, a road condition extractor is provided for extracting the environment of each road related to the presently searched guidance route. Based on the road conditions as read by the road condition extractor, a facility canceler acts to make a decision as to whether a presently extracted facility is to be withdrawn as far as the search is concerned.

The road condition extractor reads from the road data file F4, for example, road attribute data and caution/warning data. The resultant read data may be used to determine the road environment of the guidance route nearest to the extracted facility, thereby enabling the facility canceler to determine if it is difficult for the vehicle to stop at such facility. This will inhibit any improper selection of such facility if it is very difficult for the vehicle to get to it.

It should also be noted that external information such as the VICS or ATIS may be used for obtaining the stop-at facility extraction conditions. For instance, in the case where one parking area around the target point is extracted as the stop-at facility, any nearby parking areas are extracted using the external information including VICS or ATIS, and by taking into account the full/empty state of each parking area and/or the traffic congestion on roads around that facility, a usable parking lot can be designated. This may serve to further reduce the risk of selecting unsuitable or "erroneous" facilities. Additionally, a unique processing is provided to force the nearby facility search processing start instruction to be disenabled while the vehicle is running.

As can be seen from the foregoing, with the navigation system embodying the invention, whenever the driver happens to want to stop at a certain place on the way to the initially intended target place, some along-the-path facilities are promptly displayed along with their respective distances as measured from the vehicle's present position. This may widen the range of selection of such stop-at required facility, thereby enabling optimized facility selection.

For example, while the vehicle is on the way to the target point from a present position thereof, even if no facilities satisfying the purpose are found, one satisfactory facility may exist at a "past" location along the guidance route, to which the vehicle can go if it turns around. Even in this case, the navigation apparatus embodying the instant invention can provide easy selection of a stop-at facility by permitting visual indication of several past facilities located along the guidance route.

Another advantage of the embodiment is that in the case where a plurality of stop-at facilities are extracted, the time required for facility selection can be shortened by intensifying the narrowing search conditions as described previously to thereby display only limited stop-at facilities that meet the user's demands more significantly.

The facility search processing may be modified so as to conduct a search for facilities based on the route with respect to the entire area of associated map information. In this case, the user who is driving the vehicle along the route can stop at his or her preferred facility without having to significantly get out of the route. In addition, selectively displaying certain facilities within a desired range from a reference point (for example, a present position, target point, or cursor position) may enable the user to obtain his or her requested information quickly and distinctly.

A further advantage of the embodiment is that the position or location of any desired facility relative to the route can be specifically indicated by providing schematic diagrams indicative of the positional relation based on the route information and facility information. Furthermore, since the navigation system is designed to make a decision as to on which side (i.e., right side or left side) of the forward route direction the presently searched facility is present, it becomes possible to more particularly indicate the positional correlation of the route versus facilities.

In the schematic diagram preparation processing, the schematic diagram is arranged to encompass a specific range from the start point up to the target point. Alternatively, in the case where the target point and additive transit node(s) are set with a present position as a reference, the schematic diagram may be modified so that it indicates the target point and transit node(s) from the present position, or it employs a rough route configuration including one segment extending from the start point to one transit node and another segment from the transit node up to the target point. Additionally, indicating such transit node(s) in the schematic diagram may enable easy selection of a facility on occasions where the driver wants to stop at one facility before the vehicle passes through it.

A description will now be given of another vehicle navigation system in accordance with the invention.

14. Second Embodiment

Figure 22:
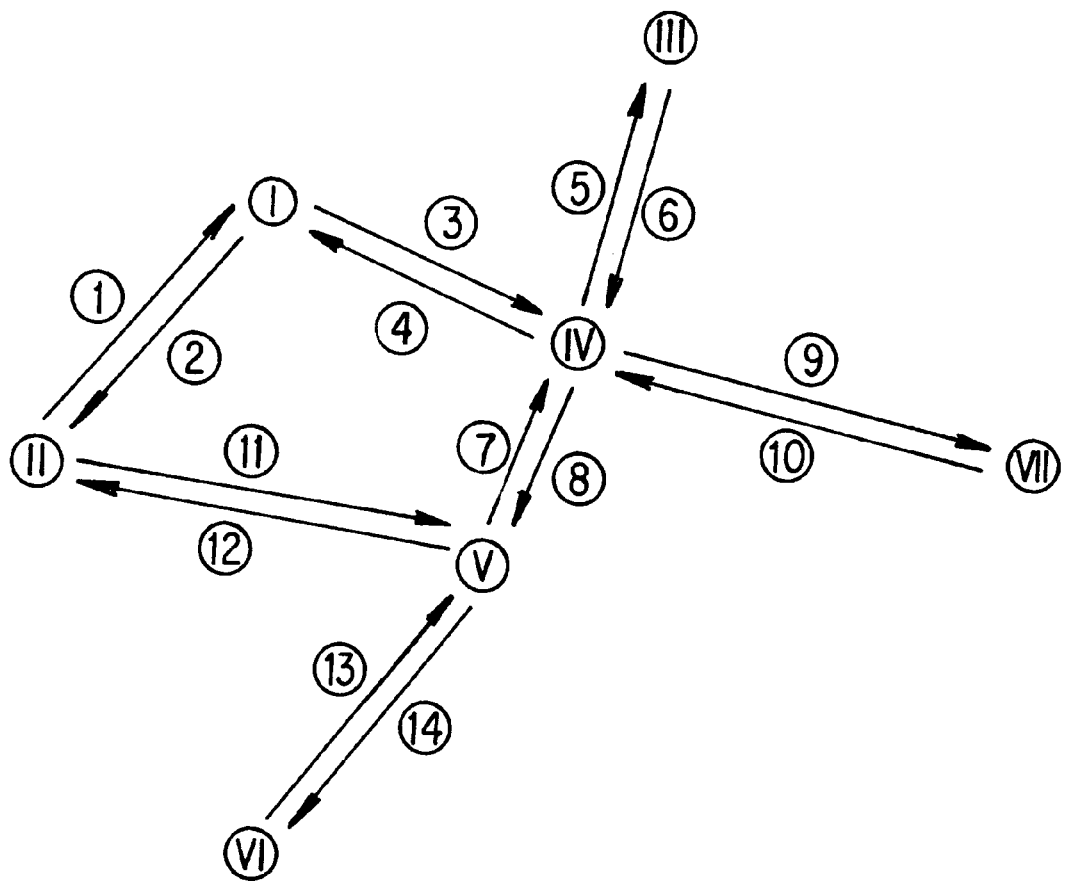
FIG. 22 is a diagram showing an exemplary road network as processed by the navigation apparatus.

Turning to the second embodiment, one exemplary road network is shown in FIG. 22 wherein several roads designated by numbers (1) to (14) associate with road junctions or intersections denoted by numbers I to VII. As shown in FIG. 24, the road No. (1) may be defined such that it has: a next road No. (11) with the same start point, a next road No. (4) with the same termination or end point, a start point corresponding to intersection No. II, an end point corresponding to intersection No. I, a node array pointer A000, and road length of 1,000 m. In this way, the roads are sequentially defined in number in the table format of FIG. 24, thereby defining the road network.

Figures 23A, 23B:
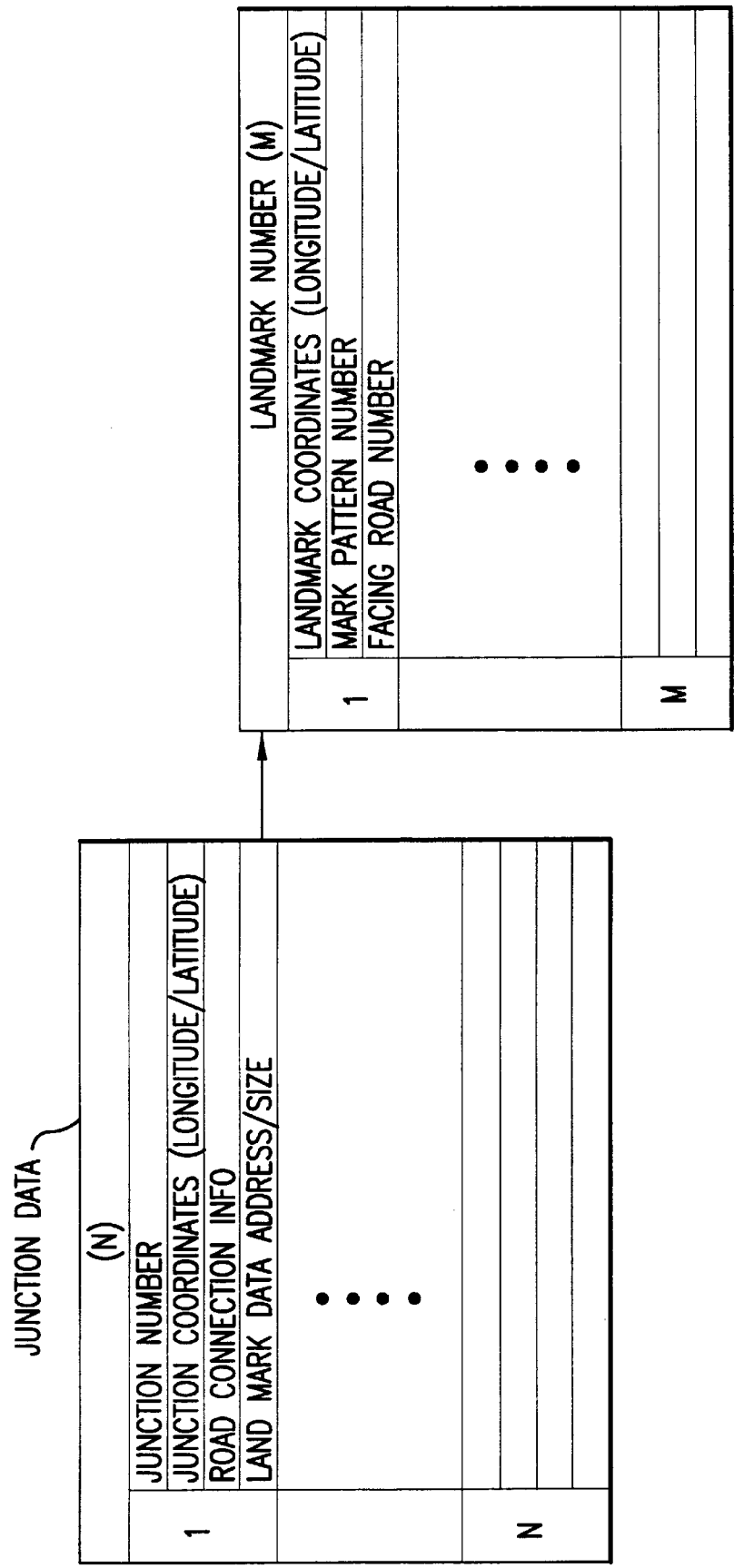

FIGS. 23a–23d diagrammatically represent data as to intersections. As shown in FIG. 23a, each intersection is added with the junction number, junction coordinates (latitude and longitude), road connection information, and landmark (eye-catch mark pattern) data address/size. As shown in FIG. 23b, the landmark data for each landmark m comes with landmark coordinates (latitude and longitude), a mark pattern number, and a facing road number (two road numbers are stored if the landmark is at the corner of an intersection). As shown in FIG. 23c, the mark pattern number is determined for example as follows: "0" is for ○○ bank mark illustration data, "1" for 00 bank mark illustration data, "2" for □□ bank mark illustration data, "3" for ΔΔ gas-station mark illustration data, and "4" for ▽▽ gas-station mark drawing data, and so forth.

Additionally, as shown in FIG. 23d, each landmark (eye-catch mark) data is added with an offset value, mark pattern number, and facing road number. Here, all the landmark data items and intersection data items are stored on a one-to-one correspondence bases. The landmark data may be accompanied with corresponding longitude/latitude coordinates, or, as shown in FIG. 23d, it may come with an offset value with the intersection coordinates as a reference (vector value with its associated intersection coordinates as the origin). The latter will be more preferable than the former because landmark drawing control becomes simpler when landmarks are to be drawn into an enlarged intersection diagram which assumes that the vehicle's running direction and the entrance direction thereto are deemed upward.

FIGS. 25a through 26d are diagrams showing several structures of the road data in accordance with the invention. FIG. 25a shows guidance road data, which may include for every road (e.g., with respect to each of the road numbers (1) to (14) as shown in FIGS. 22 and 24) a chain of data items such as a length, road attribute data (see FIG. 26a), shape data address/size, and guidance data address/size. The shape data has, for example, the longitude/latitude data as shown in FIG. 25b. As shown in FIG. 25c, the guidance data contains therein a junction identification ID (i.e., name/title), presence/absence indication of a signal, landmark data, caution or warning data, road ID (name/title), road ID audio data address/size, and destination data address/size.

Figures 25D, 25E:
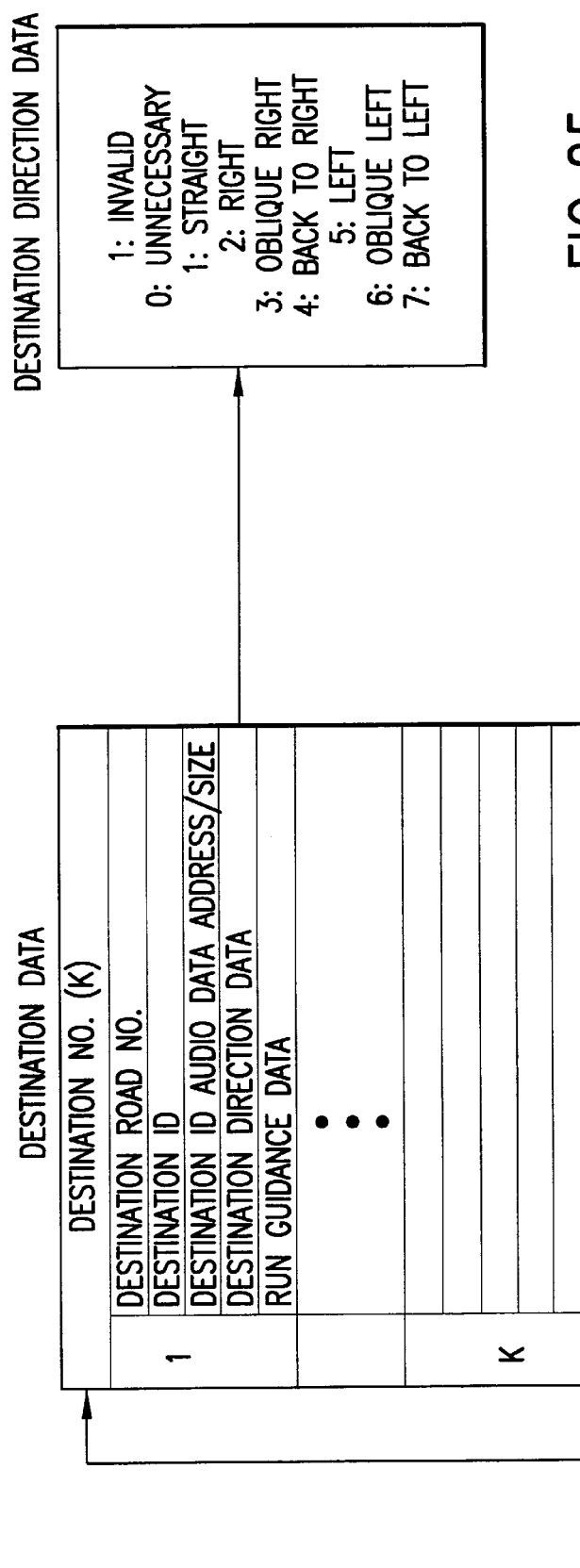

It is apparent from viewing FIG. 25d that the destination data contains a destination road number, destination ID, destination ID audio data address/size, destination direction data, run guidance or navigation data, and possibly other data. As shown in FIG. 25e, the destination direction data has either one of the following data items: "−1" indicative of invalid, "0" for unnecessary, "1" for go-straight, "2" for right direction, "3" for oblique right direction, "4" for turn back to the right, "5" for left direction, "6" for oblique left direction, and "7" for turn back to the left.

As shown in FIG. 26a, the road attribute data typically consists of a first part regarding the elevated-track/subway road data, and a second part concerning the lane number. The road attribute data includes indication of an elevated track, "beside the elevated-track," subway road and "beside the subway road," whereas the lane number data contains indication of "equal to or more than three lanes," two lanes, single lane and absence of center line.

As shown in FIG. 26b, the road ID data consists of a road kind or type data block and a type number data block, wherein the former is divided into a plurality of data items including a highway, city speed-way (expressway), toll road (turnpike), and public road. The public road data is subdivided into categories of national road, prefectural road and others. Regarding the highway data, it is "1" for a trunk line, or "2" for an access line (branch road) to be coupled to a next road. The city speed-way and toll road data are similarly subdivided.

As shown in FIG. 26c, the caution data includes the plurality of data items that follow: a railroad crossing, tunnel entrance, tunnel exit, lane-width decrease point, and "no cautions associated." As shown in FIG. 26d, the navigation guidance data contains several data items including: "from right," "from left," "from center," and "none."

Figure 27:
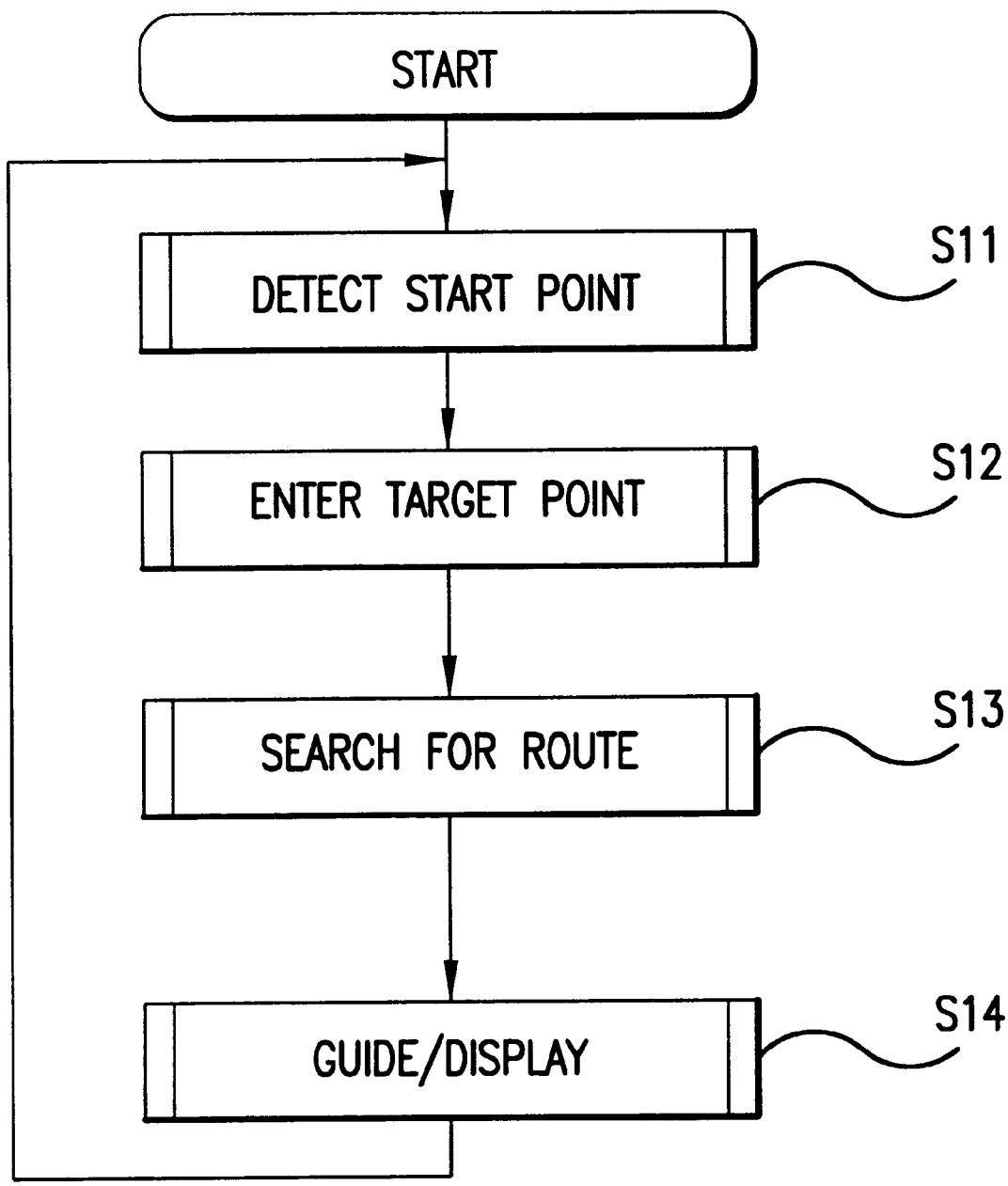
FIG. 27 is a flow diagram of a principal control procedure of the navigation apparatus embodying the invention.

FIG. 27 is a flowchart showing the main control procedure for navigation operations of a navigation system in accordance with the second embodiment of the invention, as will be described in detail below.

Upon activation of the navigator, the control procedure begins with step S11 which attempts to detect a present position of the vehicle by use of an associated present position detector device. Then, at step S12, a target point input processing is carried out to permit entry of any desired target place. Entry of such target place may be done through a touch screen 34 as shown in FIG. 1. Entry of a target point may alternatively be accomplished based on telephone numbers.

Control goes to step S13 to search for a route leading to the target place based on a vehicle's present position being detected by the present position detection processing and the target place which has been input by the target-place input processing. More specifically, this task includes substeps of: calculating one specific node nearest to the coordinates of the input target place; and then, conducting a search for a route leading to the resulting node calculated from the present position, which search is based on several search conditions (for example, the minimum distance, minimum time, presence/absence of toll-road priority, and ease of running). Control goes next to step S14 which executes route guidance pursuant to a resultant path or route as searched by the route search processing, which guidance is based on the detection result of the present position detector (including, for example, GPS, gyro sensor, and distance sensor) and also by taking into account of the actual movement of the vehicle's present position.

Figure 19:
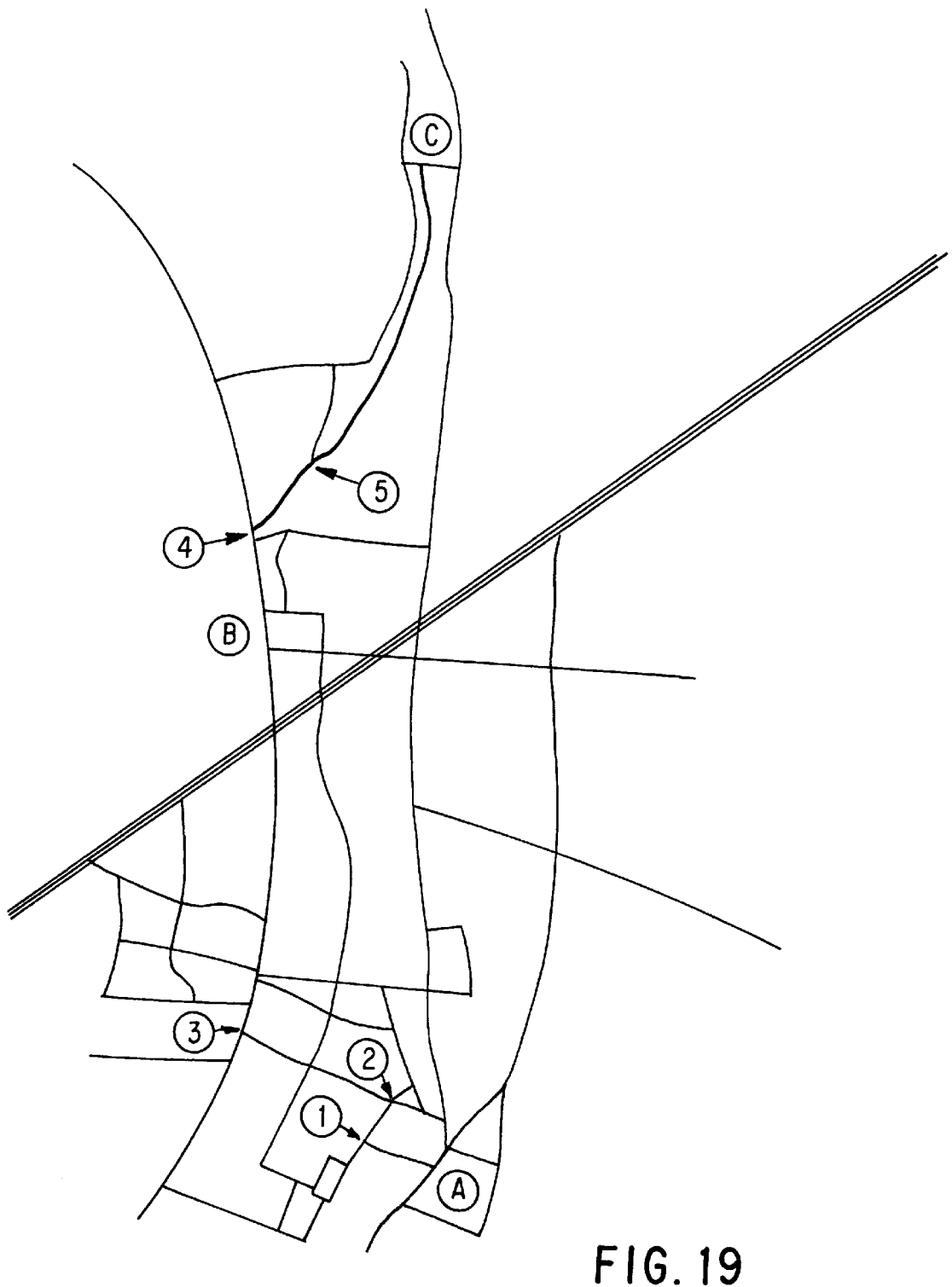
FIG. 19 is a presentation of an exemplary route resulting from the route search made by the navigation apparatus embodying the invention.
Figure 20B:
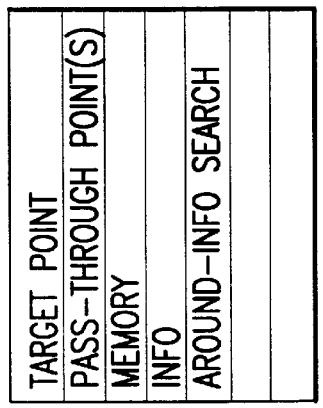
FIGS. 20a–d are diagrams showing several possible indication examples, including a guidance display on the route and point-search indication of a gas station, all being available in the navigation apparatus of the invention.

A guidance display and point search display scheme of the second embodiment system will now be described with reference to FIGS. 19 to 21. FIG. 19 is part of an associated map that shows one exemplary route in the route search as executed by the navigator embodying the invention. FIGS. 20a to 20d show some exemplary guidance indication and point-search display images which may take place while the vehicle is running along the route. FIG. 21 is a flowchart of a guidance display/point-search display processing to be performed by the navigator.

Imagine in the map of FIG. 19 that the vehicle leaves from the Minami Grade School (A) with this place as a start point to travel for its target place (e.g., Kannon-Do temple and shell-heap historic site (C)) by way of a certain pass-through or transit place, here, Komuro Grade School (B).

In this situation, the start point (A), transit node (B) and target point (C) are set in the navigator. When the vehicle arrives at an intersection (1) in the nap of FIG. 19, the navigator provides voice guidance suggesting it to turn to the right while displaying a "turn-to-the-right" intersection diagram. Accordingly, the driver of the vehicle turns to the right and continues running. Thereafter, it arrives at another intersection (2); then, the navigator provides voice guidance suggesting it to turn to the left while displaying a "turn-to-the-left" intersection diagram, the user of the vehicle turns to the left accordingly and continues running. Thereafter, the vehicle arrives at a still another intersection (3). At this time, the navigator provides voice guidance suggesting it to turn to the right while displaying a "turn-to-the-right" intersection diagram. Accordingly, the user of the vehicle turns to the right and continues running. As shown in FIG. 20a, this intersection (3) is accompanied with a guidance indication of a gas station 2. Here, the numeral 1 designates a corresponding picture image of the intersection, 3 denotes the intersection ID ("A" town, in this example), 7 indicates the vehicle's present position, and 8 is an arrow mark showing the "turn-to-the-right" movement.

Turning back to FIG. 19, after the vehicle turns to the right at intersection (3) to continue running along the road, it arrives at a left-hand transit node B in the map. Assume that this point is for picking up a fellow passenger who is expected to ride in the vehicle.

Imagine that the driver becomes aware of the shortage of gasoline which necessitates him or her to search for a gas station. If this is the case, the driver operates the navigator causing it to display a search menu as shown in FIG. 20b. Upon selection of an item labeled "around-information search," the genre list of FIG. 20c is soon displayed. The driver selects a menu item "gas station" and sets a "10-km around" condition.

Figure 20D:
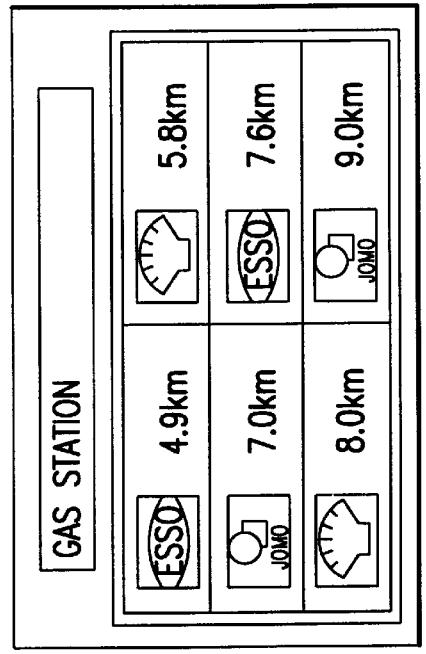
Figure 20A:
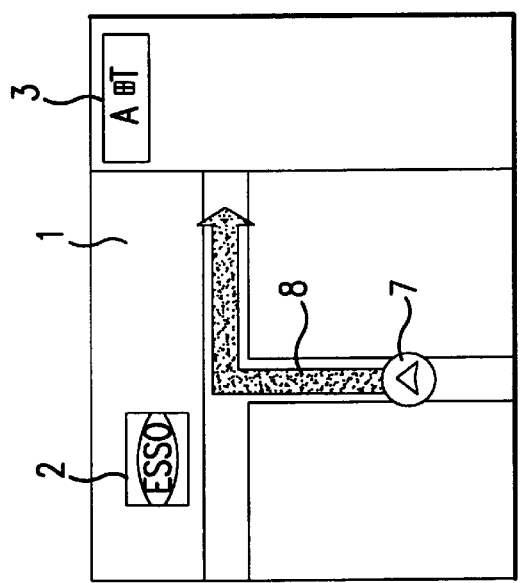
Figure 20C:
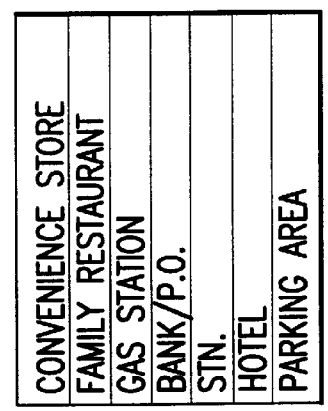
Figure 21:
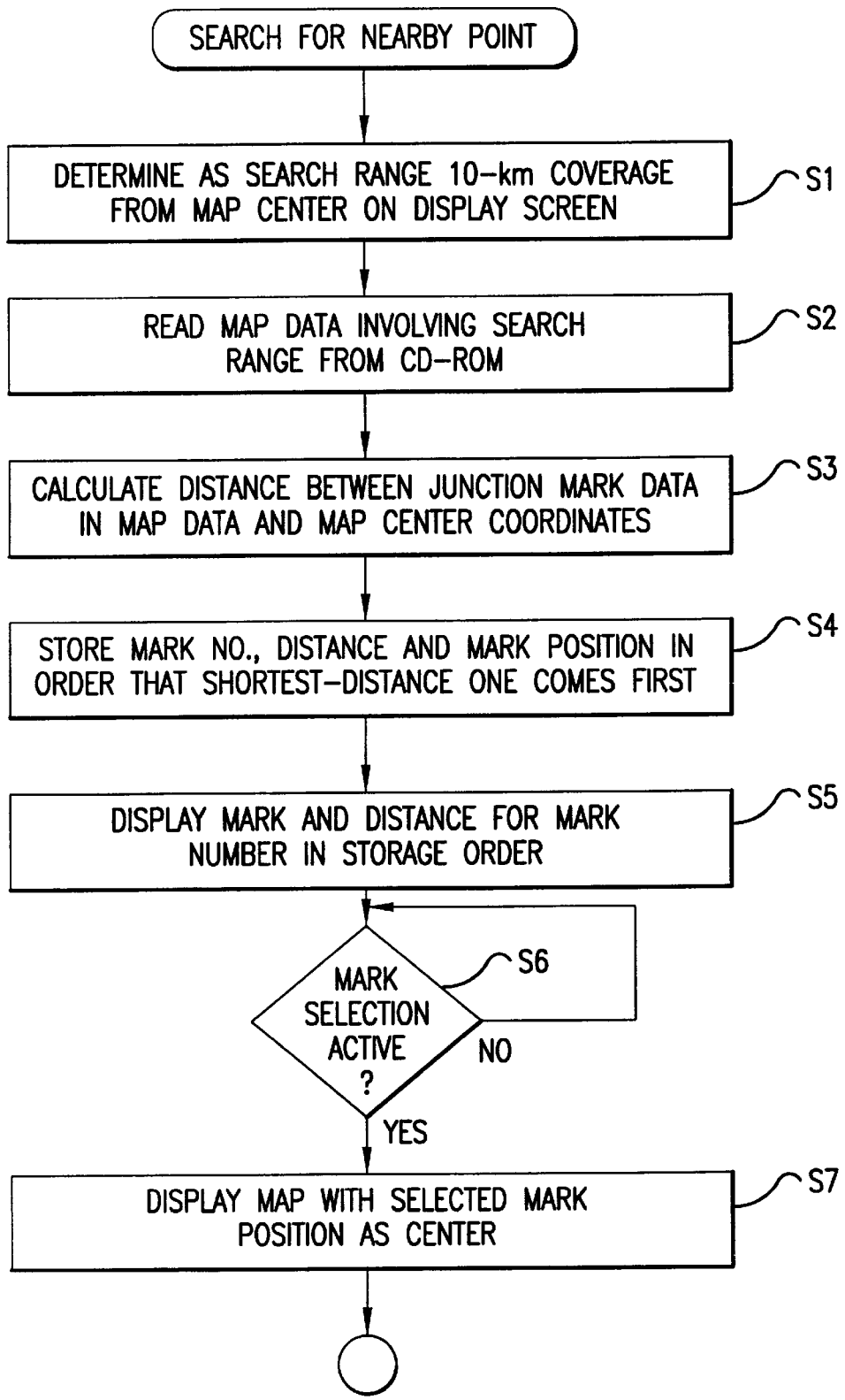
FIG. 21 is a flow diagram of a guidance display/point search display control procedure of the navigation apparatus.

Then, a list of several nearby gas stations are diagrammatically indicated using their corresponding marks as shown in FIG. 20d. This diagrammatic image contains therein official marks of gas stations along with respective distances from the present position. Upon selection of one preferable gas station, the navigator begins conducting a search with this gas station as a target point. After the search is done, the result is displayed on a display screen (not shown).

After the route search enabled the vehicle to refuel at the gas station, the navigator again attempts to search for the preceding target place (C) allowing the vehicle to travel through intersections (4), (5) to thereby finally reach the target place (C).

Note here that the gas stations represented by the marks may also be used as part of point-search information together with guidance display information for route guidance.

A description will be given of the guidance display/point-search scheme as employed in the navigator embodying the invention in connection with FIGS. 1, 19 and 21.

As shown in FIG. 21, the control procedure includes the steps of:

(1) setting as the search area a region of coverage of 10 km with a map center being presently displayed as a search area center (step S1);

(2) reading CD-ROM map data within the search range from a map information file of an information storage device 37 (step S2);

(3) causing a CPU 2 to calculate or compute a distance between a junction (eye-catch) mark information (landmark data) and the coordinates of the map center (step S3);

(4) storing resultant mark no., distance and mark position data calculated by the CPU in a distance-decremental sequence so that the shortest distance comes first and the longest one comes last (step S4);

(5) displaying pairs of marks and distance values corresponding to respective mark numbers in a storage order, while permitting use of the exemplary diagrammatic image shown in FIG. 20d if they are related to gas-station information (step S5); and (6) determining whether the user operation selects a mark from those presently displayed (step S6); if YES, displaying the map information with the selected mark as a center is provided (step S7); and if NO, repeating the determination (step S6).

A register device and its associated storage device for storing therein registered information are arranged to enable registration of the selected facility as a particular point such as a transit node or target place, whereby it becomes possible to recalculate the route to a corresponding facility to provide maximized convenience.

While the embodiment is arranged to include the landmark data in the intersection data, it may be modified so that the landmark data is stored in the road data, or alternatively, used as an eye-catch mark data containing therein position coordinates, mark information and others.

In the navigation apparatus arranged as described above, the facility search data for use in searching for nearby facilities can remain cooperative and common with the map information for displaying the maps while reducing the required data capacity as a whole. Further, due to the possibility of displaying or visually indicating landmarks indicative of corresponding facilities, when compared with the genre-designation search scheme, it becomes possible for users to readily recognize the facilities being presently displayed enabling execution of optimal facility search.

While the foregoing description is made under an assumption that the embodiment is drawn to the point-search for a gas station, the present invention should not be limited exclusively thereto. The point-search may be extended, for example, to a search for a parking area which is hard to find in the city. In this case, drivers can easily determine their preferred parking area during a drive without having to iteratively access other information sources. Moreover, it is also possible during a drive to obtain some related information regarding, for example, the nearest convenience store, family restaurant, bank, post office, station, or hotel. As can be seen from the foregoing, utilizing the route guidance display information also as part of point-search information may enable drivers to obtain any information of interest relating to nearby facilities while they are driving their mobile vehicles, thus permitting more comfortable driving.

Although the preferred embodiments of the invention have been illustrated in detail, it should be apparent that modifications and adaptations to those embodiments may occur to one skilled in the art without departing from the scope of the invention. For instance, the data storage devices for storage of various kinds of data shown in FIG. 4 may be any data writable devices, including floppy diskette drive modules. The navigator may be arranged to come with a voice input device having an analog-to-digital converter, wherein respective operations are made under voice instructions as input through the audio input device.

Further, the navigator system of the invention may not necessarily include the entire subroutine program modules shown in FIG. 9 in the program block 38*b* of the information storage unit 37 of FIG. 1. For example, while the present position processing, target point set processing, route search processing and guidance/display processing of steps SA2 through SA5 are executed using program block 38*b* in information storage unit 37, the program module for the nearby facility search at step SA6 or for the route search processing may not be stored in information storage unit 37. In such case, the nearby facility search/extraction processing or route search processing is performed in an external remote information control center such as VICS, ATIS which are communicatable with the navigator through the data transmission/reception device 27 of FIG. 1.

More specifically, pertinent information as to the nearby facility search conditions and route search conditions are transmitted from the navigator to the information control center. Upon request, this center conducts a search for any desired facility and/or the best possible route leading to a target place based on the search or retrieve conditions as externally transmitted. After such search is conducted, the center sends forth and provides the road guide information as search/retrieval/extraction results along with associative map information. Upon receipt of such information, the navigator attempts to display one or a plurality of corresponding facilities. With such an arrangement, it is possible to perform a required search, retrieval and extraction of facilities based on detailed and updated information of respective facilities located around the vehicle's present position. It is also possible to render the facility search sensitive to any possible environmental changes (e.g., implementation of one-way roads) in the related roads. In this case it is required that the information concerning respective facilities as stored in the remote information control center be updated every time such changes take place.

Still alternatively, the navigator may be modified such that the guidance/display processing at step SA5 in FIG. 9 is the only process that is always executed using the program block 38*b* in information storage unit 37 of FIG. 1, which may be executed by the aforesaid remote information control center such as VICS. In this case the map information may be provided by the center, rather than by the data block 38*c* of unit 37. In addition, the vehicle's present position detection is also carried out based on information signals being transmitted to or received from the VICS information control center, thereby enabling the navigator to execute only the guidance/display processing based on the map information as transmitted from the VICS center. With such an arrangement, it becomes possible at any event to execute any required route search based on the updated road information and map information.

Still further, respective program modules following that of FIG. 9 and the information storage unit 37 for storage of map information and display symbol data may be separated from the navigator, which will enhance the useability by enabling various types of devices to offer navigation functions.

The facility marks and ID indication image components shown in FIG. 17 should not be limited exclusively to the illustrative embodiment. These may be freely changed in color, luminosity, brightness, size and shape while allowing them to at least partially blink if needed thereby enhancing the visibility. Furthermore, the principal concepts of the present invention are capable of being applied to vehicles other than mobiles, such as ships, airplanes, helicopters and others. Accordingly, the maps used in navigation may alternatively be nautical charts, sea-bottom (submarine) maps or others, rather than the road maps.

It has been described that the illustrative embodiment is capable of performing stop-at facility search along the guidance route. Particularly, in the case of searching for along-the-path facilities located along the guidance route, respective facilities are displayed along with their relative distances as measured from the vehicle's present position. This enables drivers to be aware in advance of how far a facility of interest is apart from the searched route. Further, the facility extraction conditions remain capable of being added with actual road environment of the guidance road and business content of each facility. Still further, any facility satisfying the stop-at purpose is selectable as the stop-at facility, suppressing or eliminating occurrence of any erroneous facility selection.

Moreover, the navigator is arranged to successfully determine on which side of a presently guided route the target object is located. This may serve to more descriptively indicate a surrounding area of the target object, enabling drivers to make a proper decision as to which side is appropriate in order to approach the target object.

A further advantage of the invention is that data capacity can be reduced due to the fact that the searching for the nearest facility is executable by use of data of landmarks. Moreover, in the situation where a specific facility involving, for example, a gas station or an eating place is under search, it is impossible in the prior art to identify the specific kind of a facility (for example, an eating place as being either Japanese noodle, sushi, or curry), before actual arrival at the place although the user was aware of the genre of such facility. By contrast, with the invention, the user can be successfully guided to the nearest facility using easy-to-see diagrammatic marks thus enabling enhancement of visibility and recognizability. Additionally, the searched facility can be narrowed in scope, which in turn leads to accomplishment of a user's easy selection of any desired facility.

What is claimed is:

1. A navigation apparatus comprising:

map information storage means for storing therein map information;

target data storage means for storing guidance information as to a target object which users can optionally select;

present position detection means for detecting a present position of a vehicle;

route search means responsive to map information as stored in said map information storage means, for searching for a route to a destination;

route information storage means for storing a route searched by said route search means;

target object retrieve means for retrieving a target object within a predetermined range from and along said route stored in said target data storage means on the basis of a route stored in said route information storage means; and output means for outputting a target object retrieved by said target object retrieve means on the map around the present position.

2. The apparatus according to claim 1, wherein said target object retrieve means calculates the distance between the present position of the vehicle and the respective target object, and wherein said output means outputs a target object by giving priority to shorter distance from a result of said calculation.

3. The apparatus according to claim 1, wherein said target object retrieve means calculates distance from a retrieved target object to said route and outputs calculated distance data.

4. The apparatus according to claim 1, wherein said target object retrieve means produces and outputs a schematic diagram based on said searched route and said retrieved target object.

5. The apparatus according to claim 1, wherein said target object retrieve means retrieves a specific target object from said retrieved target objects pursuant to an external input and displays a map around said specific target object.

6. The apparatus according to claim 1, wherein said target object retrieve means retrieves landmark pattern for each target object and outputs data for target object on the basis of said landmark pattern and distance data.

7. A navigation apparatus comprising:

map information storage means for storing therein map information;

target data storage means for storing guidance information as to a target object which users can optionally select;

present position detection means for detecting a present position of a vehicle;

route search means, responsive to map information stored in said map information storage means, for searching for a route to a destination;

input means for inputting a category including a specific target object;

target object retrieve means for retrieving a target object within a predetermined range from and along the route stored in said target data storage means on the basis of the route searched by said route search means and the category input by said input means;

schematic diagram preparation means for producing a schematic diagram of a route showing the relationship as to the location of the route and a specific target object on the basis of the route searched by said route search means and the target object retrieved by said target object retrieve means; and output means for outputting a schematic diagram produced by said schematic diagram preparation means.

8. The apparatus according to claim 7, wherein said target object retrieve means calculates the distance between the present position of the vehicle and the target object, and wherein said output means outputs a target object by giving priority to shorter distance from the result of said calculation.

9. The apparatus according to claim 7, wherein said target object retrieve means calculates distance from a retrieved target object to said route and outputs calculated distance information.

10. The apparatus according to claim 7, wherein said schematic diagram preparation means produces and outputs a part of a route passed by the vehicle as a part of schematic diagram.

11. The apparatus according to claim 7, wherein said target object retrieve means determines whether predetermined condition is satisfied or not, based on route data and target data, and extracts a specific target object to be output based on said determination.

12. The apparatus according to claim 7, wherein said target object retrieve means searches for a specific target object from said retrieved target objects pursuant to an external input and displays a map around said specific target object.

13. The apparatus according to claim 7, wherein said present position detector means, said target input means, said target search means, said schematic diagram preparation means, said target search means, and said route finder means, are a software program as stored in a recording medium, and wherein said apparatus executes processing tasks of respective means based on said program.

14. The apparatus according to claim 7, wherein selective ones of said map information storage means, said present position detector means, said target input means, said target search means, said schematic diagram preparation means, said target search means, and said route finder means, are provided at a separate location from the vehicle, while selective others of said means absent at the separate location are arranged in the vehicle, and communication means for transmission and reception of information between the vehicle and the separate location is provided.

15. The apparatus according to claim 7, wherein said target object retrieve means determines that retrieved target object is present on either the right side or the left side of the route, and wherein said schematic diagram preparation means produces a schematic diagram based on said determination.

16. The apparatus according to claim 15, wherein said target identifier means includes:

reference point setter means for setting two points as reference points on a route;

orthogonal direction setter means for setting a line perpendicularly crossing with a line coupling the two points;

inner product calculation means for calculating a vector inner product of a direction being set by said orthogonal direction setter means and a target object being presently searched by said target search means based on a cross point between the two lines crossing at right angles with each other; and said target identifier means determining in which direction the target is present from the route based on a calculation result of said inner product calculation means.

17. The apparatus according to claim 15, wherein said output means generates an identification result indicating that the target object is present on one of the right side and the left side of a reference line including one of the route searched by said route finder means and a reference direction as set by said direction setter means;

said output means indicating the side by one of visual and audible indication schemes, while allowing the identification result to remain identical in one of column, size and position regardless of a distance from one of the searched route and the reference direction.

18. The apparatus according to claim 15, wherein said target object retrieve means calculates the distance between the target object and the route, and wherein schematic diagram preparation means displays said calculated distance.

19. The apparatus according to claim 18, wherein the distance to the target object calculated by said distance calculation means is a distance between a selected point and the target object, said selected point being near a foot of a perpendicular line to the searched route from the target object.

20. A navigation apparatus comprising:

map information storage means for storing therein map information;

target data storage means for storing guidance information to multiple target objects which users can optionally select, each target object of the multiple target objects constituting a point of destination;

present position detection means for detecting a present position of a vehicle;

route search means, responsive to map information as stored in said map information storage means, for searching for a route to an ultimate destination;

route information storage means for storing the route to the ultimate destination searched by said route search means;

target object retrieve means for retrieving at least one target object of the multiple target objects stored in said target data storage means within a predetermined range from and along the route to the ultimate destination, the target object retrieve means giving priority to target objects that are closer to the route to the ultimate destination stored in the route information storage means than other target objects; and output means for outputting the at least one target object retrieved by said target object retrieve means on the map around the present position, so as to provide guidance information to the at least one target object which is most conveniently located relative to the route to the ultimate destination.

\* \* \* \* \*